(12) United States Patent
Miyata et al.

(10) Patent No.: US 10,738,858 B2
(45) Date of Patent: Aug. 11, 2020

(54) VARIABLE-SPEED SPEED INCREASER, VARIABLE-SPEED SPEED INCREASER CONTROL DEVICE, AND VARIABLE-SPEED SPEED INCREASER CONTROL METHOD

(71) Applicant: MITSUBISHI HEAVY INDUSTRIES COMPRESSOR CORPORATION, Tokyo (JP)

(72) Inventors: Hiroyuki Miyata, Hiroshima (JP); Masahiro Kobayashi, Hiroshima (JP); Yasushi Mori, Hiroshima (JP); Yoshiyuki Okamoto, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 37 days.

(21) Appl. No.: 16/099,619

(22) PCT Filed: Nov. 17, 2016

(86) PCT No.: PCT/JP2016/084090
§ 371 (c)(1),
(2) Date: Nov. 7, 2018

(87) PCT Pub. No.: WO2018/016097
PCT Pub. Date: Jan. 25, 2018

(65) Prior Publication Data
US 2019/0186600 A1 Jun. 20, 2019

Related U.S. Application Data

(63) Continuation of application No. PCT/JP2016/071248, filed on Jul. 20, 2016.

(51) Int. Cl.
*F16H 3/72* (2006.01)
*F16D 25/061* (2006.01)
(Continued)

(52) U.S. Cl.
CPC ........... *F16H 3/724* (2013.01); *F16D 25/061* (2013.01); *F16H 3/72* (2013.01); *H02K 7/108* (2013.01); *H02K 7/116* (2013.01); *H02K 9/06* (2013.01)

(58) Field of Classification Search
CPC ............... F16H 3/72–728; H02K 7/116; F16D 25/061–065
See application file for complete search history.

(56) References Cited

U.S. PATENT DOCUMENTS 6,018,694 A 1/2000 Egami et al.
7,004,868 B2 * 2/2006 Oshidari ................ B60K 6/365
475/5
(Continued)

FOREIGN PATENT DOCUMENTS

JP H04-060254 A 2/1992
JP H09-211015 A 8/1997
(Continued)

OTHER PUBLICATIONS

Non-Final Office Action in corresponding U.S. Appl. No. 16/093,005, dated Jul. 11, 2019 (20 pages).
(Continued)

*Primary Examiner* — David R Morris
(74) *Attorney, Agent, or Firm* — Osha Liang LLP

(57) ABSTRACT

A variable-speed speed increaser includes: an electric driving device that generates a rotational driving force; and a transmission device that changes the speed of the rotational driving force generated by the electric driving device and transmits the changed rotation driving force to a driving target. The transmission device includes: a sun gear; a sun gear shaft fixed to the sun gear; a planetary gear that meshes with the sun gear; an internal gear; a planetary gear carrier that has a planetary gear carrier shaft; and an internal gear carrier that has an internal gear carrier shaft. The electric
(Continued)

driving device includes: a constant-speed motor that has a constant-speed rotor; and a variable-speed motor that has a variable-speed rotor. The internal gear carrier includes a clutch mechanism that connects a cylindrical portion connected to the internal gear with the internal gear carrier shaft.

21 Claims, 16 Drawing Sheets

(51) Int. Cl.
    *H02K 7/108*     (2006.01)
    *H02K 7/116*     (2006.01)
    *H02K 9/06*      (2006.01)

(56) References Cited

U.S. PATENT DOCUMENTS

| | | | |
|---|---|---|---|
| 7,211,018 B2* | 5/2007 | Kimura | F16H 3/724 |
| | | | 475/153 |
| 7,494,438 B2* | 2/2009 | Kimura | F16H 3/724 |
| | | | 475/150 |
| 10,177,692 B2* | 1/2019 | Kobayashi | H02K 7/003 |
| 10,465,774 B2* | 11/2019 | Okamoto | F16H 61/02 |
| 10,473,193 B2* | 11/2019 | Okamoto | F16H 61/02 |
| 10,544,862 B2* | 1/2020 | Okamoto | F16H 61/66 |
| 2003/0064847 A1 | 4/2003 | Oshidari et al. | |
| 2005/0113201 A1 | 5/2005 | Kimura et al. | |
| 2006/0101942 A1 | 5/2006 | Onishi et al. | |
| 2007/0155570 A1 | 7/2007 | Kimura et al. | |
| 2017/0141706 A1* | 5/2017 | Kobayashi | H02K 7/003 |
| 2017/0155345 A1* | 6/2017 | Kobayashi | H02P 6/04 |
| 2018/0187778 A1* | 7/2018 | Okamoto | F16H 3/724 |
| 2018/0245671 A1* | 8/2018 | Okamoto | F16H 3/728 |
| 2018/0252300 A1* | 9/2018 | Okamoto | F16H 61/0246 |
| 2019/0048978 A1* | 2/2019 | Okamoto | H02P 3/24 |
| 2019/0048979 A1* | 2/2019 | Okamoto | H02P 1/24 |
| 2019/0068090 A1* | 2/2019 | Okamoto | H02K 7/116 |
| 2019/0093742 A1* | 3/2019 | Okamoto | F16D 41/185 |
| 2019/0107189 A1* | 4/2019 | Kobayashi | F16H 57/00 |
| 2019/0113111 A1* | 4/2019 | Okamoto | H02K 9/06 |
| 2019/0170221 A1* | 6/2019 | Okamoto | F16H 3/725 |
| 2019/0181779 A1* | 6/2019 | Okamoto | H02P 6/04 |
| 2019/0226557 A1* | 7/2019 | Okamoto | F16H 3/72 |
| 2019/0264779 A1* | 8/2019 | Okamoto | F16H 1/2827 |

FOREIGN PATENT DOCUMENTS

| | | |
|---|---|---|
| JP | H10-238381 A | 9/1998 |
| JP | 2004 150609 A | 5/2004 |
| JP | 2004-150609 A | 5/2004 |
| JP | 4472350 B2 | 6/2010 |
| JP | 2010 242811 A | 10/2010 |
| JP | 2010-242811 A | 10/2010 |
| WO | 2016-010146 A1 | 1/2016 |
| WO | 2018-016021 A1 | 1/2018 |

OTHER PUBLICATIONS

International Search Report issued in corresponding International Application No. PCT/JP2016/067764, dated Aug. 23, 2016 (4 pages).
Written Opinion of the International Search Authority issued in corresponding International Application No. PCT/JP2016/067764, dated Aug. 23, 2016, with translation (10 pages).
International Search Report for corresponding International Application No. PCT/JP2016/084090, dated Feb. 14, 2017 (2 pages).
Written Opinion for corresponding International Application No. PCT/JP2016/084090, dated Feb. 14, 2017 (7 pages).
International Search Report for corresponding International Application No. PCT/JP2016/071248, dated Oct. 11, 2016 (2 pages).
Written Opinion for corresponding International Application No. PCT/JP2016/071248, dated Oct. 11, 2016 (7 pages).

* cited by examiner

AXIAL DIRECTION
INPUT SIDE ←——→ OUTPUT SIDE

AXIAL DIRECTION
INPUT SIDE ←——→ OUTPUT SIDE

FIG. 9
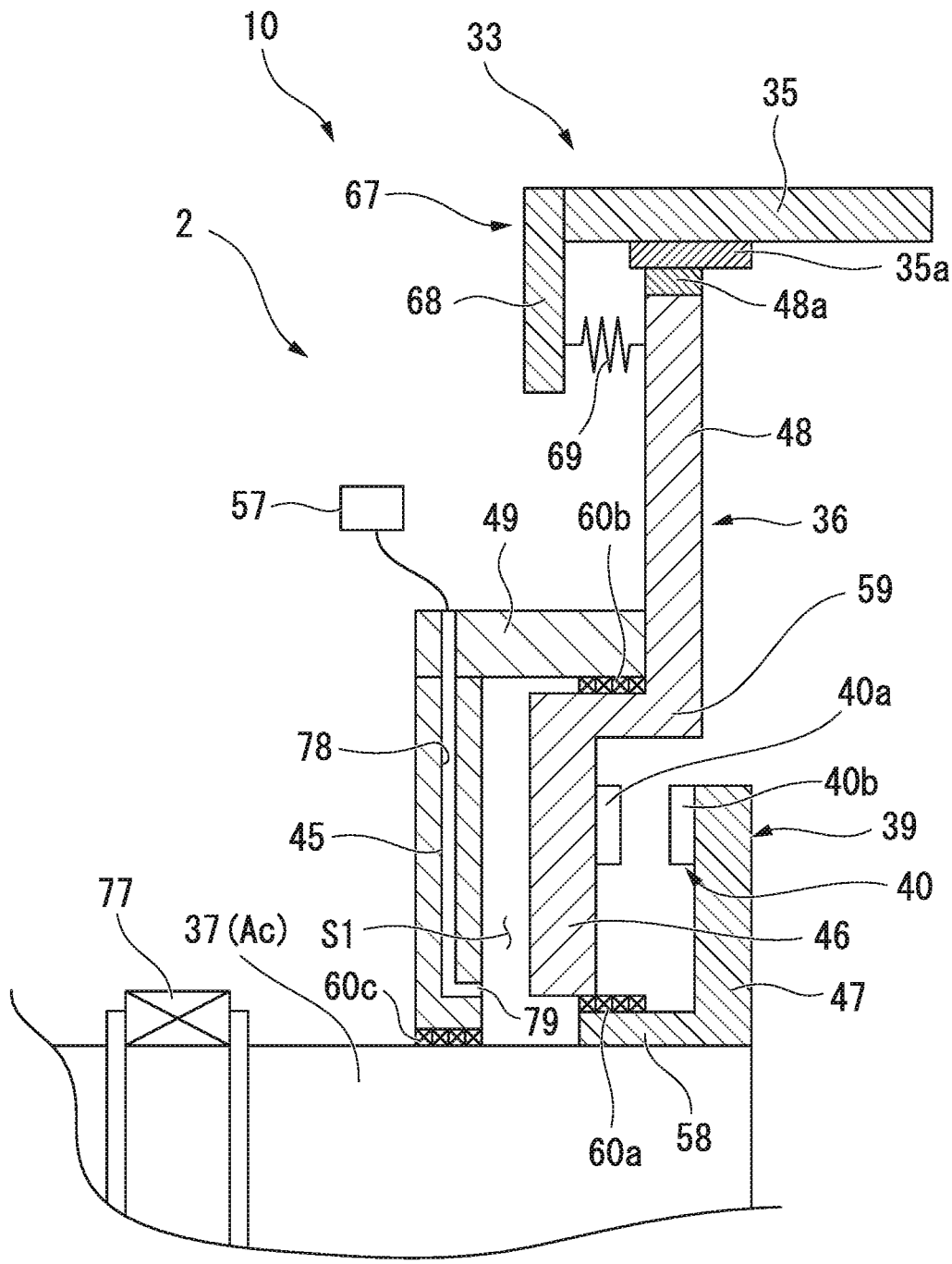

AXIAL DIRECTION
INPUT SIDE ←――→ OUTPUT SIDE

AXIAL DIRECTION
INPUT SIDE ←——→ OUTPUT SIDE

US 10,738,858 B2

VARIABLE-SPEED SPEED INCREASER, VARIABLE-SPEED SPEED INCREASER CONTROL DEVICE, AND VARIABLE-SPEED SPEED INCREASER CONTROL METHOD

Priority is claimed on PCT International Application No. PCT/JP2016/071248, filed Jul. 20, 2016, the content of which is incorporated herein by reference.

FIELD OF THE INVENTION

The present invention relates to a variable-speed speed increaser which includes an electric driving device including a constant-speed motor and a variable-speed motor, and a planetary gear transmission device for changing the speed of a rotational driving force generated by the electric driving device and then transmitting the speed-changed rotational driving force to a driving target, a variable-speed speed increaser control device, and a variable-speed speed increaser control method.

BACKGROUND ART

As an apparatus for driving a rotary machine such as a compressor, there is an apparatus including an electric driving device for generating a rotational driving force and a transmission device for changing the speed of a rotational driving force generated by the electric driving device and then transmitting the speed-changed rotational driving force to the rotary machine.

Patent Document 1 discloses that a constant-speed motor and a variable-speed motor for speed change are used as the electric driving device and a planetary gear transmission device is used as the transmission device to accurately control a gear ratio. In this apparatus, it is possible to change a rotation rate of an output shaft of the planetary gear transmission device connected to the rotary machine by changing a rotation rate of the variable-speed motor.

CITATION LIST

Patent Literature

[Patent Document 1]
 Japanese Patent No. 4472350

SUMMARY OF INVENTION

Technical Problem

In the above-described variable-speed speed increaser, for example, electric power supply to the electric motor may be cut off due to overvoltage, overcurrent, or the like. In such a case, both the constant-speed motor and the variable-speed motor are stopped. At this time, the variable-speed motor connected to the constant-speed motor via the transmission device or the compressor to be driven may over-rotate due to the rotation rate of the constant-speed motor or the inertia of the compressor.

The present invention relates to a variable-speed speed increaser which includes an electric driving device including a constant-speed motor and a variable-speed motor, and a planetary gear transmission device for changing the speed of a rotational driving force generated by the electric driving device and then transmitting the speed-changed rotational driving force to a driving target, and it is an object of the present invention to provide a variable-speed speed increaser capable of preventing over-rotation of the variable-speed motor or the driving target.

Solution to Problem

According to a first aspect of the present invention, there is provided a variable-speed speed increaser including an electric driving device which generates a rotational driving force, and a transmission device which changes the speed of the rotational driving force generated by the electric driving device and transmits the changed rotation driving force to a driving target, wherein the transmission device includes a sun gear which rotates about an axis, a sun gear shaft which is fixed to the sun gear and extends in an axial direction around the axis, a planetary gear which meshes with the sun gear, revolves around the axis and rotates about its own center line, an internal gear which has a plurality of teeth aligned annularly around the axis and meshes with the planetary gear, a planetary gear carrier which has a planetary gear carrier shaft extending in the axial direction around the axis and supports the planetary gear to be revolvable around the axis and rotatable around a center line of the planetary gear itself, and an internal gear carrier which has an internal gear carrier shaft extending in the axial direction around the axis and supports the internal gear to be rotatable about the axis, the sun gear shaft forms an output shaft connected to the driving target, the internal gear carrier shaft forms a constant-speed input shaft, and the planetary gear carrier shaft forms a variable-speed input shaft, the electric driving device includes a constant-speed motor having a constant-speed rotor which rotates the constant-speed input shaft of the transmission device, and a variable-speed motor having a variable-speed rotor connected to the variable-speed input shaft of the transmission device, the internal gear carrier includes a clutch mechanism which connects a cylindrical portion connected to the internal gear with the internal gear carrier shaft, and the clutch mechanism includes a moving portion which is connected to one of the cylindrical portion and the internal gear carrier shaft to be movable in the axial direction, a drive portion which drives the moving portion in the axial direction, a fixed portion which is fixed to the other one of the cylindrical portion and the internal gear carrier shaft, and an engaging portion which engages the moving portion and the fixed portion by moving the moving portion in the axial direction.

According to such a constitution, in the variable-speed speed increaser, for example, when power supply to the electric motor is cut off due to an overvoltage, overcurrent, or the like, a driving force of the constant-speed motor transmitted to the transmission device can be disconnected. Therefore, over-rotation of the variable-speed motor or the driving target can be prevented due to transmitting the rotation of the constant-speed rotor.

In the variable-speed speed increaser, the engaging portion may include a pair of disk-shaped members which are provided on the moving portion and the fixed portion and have a plurality of claws formed at regular intervals in a circumferential direction around the axis.

The variable-speed speed increaser may further include a moving portion controller which moves the moving portion in the axial direction to bring the claws of the disk-shaped members into contact with each other, and an engagement promotion portion which controls at least one of the constant-speed motor and the variable-speed motor such that at least one of the constant-speed rotor and the variable-speed rotor is caused to perform an engagement promoting operation, thereby promoting engagement between the disk-shaped members.

According to such a constitution, it is possible to reliably engage the engaging portion between the moving portion and the fixed portion by performing the engagement promoting operation at the time of activation of the variable-speed speed increaser.

In the variable-speed speed increaser, the control device may include an engagement determination portion which determines an engagement state of the engaging portion on the basis of a movement amount of the moving portion and repeats the engagement promoting operation when the movement amount is less than a threshold value.

According to such a constitution, it is possible to eliminate a situation in which the engaging portion is not engaged despite the engagement promoting operation.

In the variable-speed speed increaser, the drive portion may include a disk which is fixed to the other one of the cylindrical portion and the internal gear carrier shaft to face the moving portion in the axial direction and forms an oil supply space between the disk and the moving portion, an oil supply portion which supplies oil into the oil supply space, and an oil discharge portion which discharges the oil from the oil supply space.

According to such a constitution, it is possible to move the moving portion using the oil supplied to the bearing due to a constitution in which the moving portion is moved due to the oil pressure. Also, the engagement due to the engagement portion can be released by discharging the oil from the oil supply space.

The variable-speed speed increaser may further include an oil leak hole which allows the oil to leak from the oil supply space, an oil pressure sensor which measures an oil pressure in the oil supply space, and a control device which controls the oil supply portion so that the oil pressure becomes constant.

According to such a constitution, increase in temperature of the working oil can be minimized. Also, contamination of the working oil can be minimized.

In the variable-speed speed increaser, the oil supply portion may include an oil supply path which is formed in at least one of the fixed portion and the disk, and a nozzle which supplies the oil supplied to the oil supply path into the oil supply space.

In the variable-speed speed increaser, the oil supply space may include a first oil supply space which is formed between the moving portion and the disk, and a second oil supply space which communicates with the first oil supply space and is formed inside the constant-speed rotor, and the oil supply portion may supply the oil into the second oil supply space.

According to such a constitution, due to the centrifugal force applied to the oil, the oil is supplied not to the first oil supply space in which the pressure becomes higher but to the second oil supply space in which the pressure is lower. Thus, it is possible to easily supply the oil to the oil supply space.

In the variable-speed speed increaser, the variable-speed rotor may be formed in a cylindrical shape centered on the axis, and the constant-speed input shaft may be inserted through a shaft insertion hole which passes therethrough in the axial direction.

According to a second aspect of the present invention, there is provided a variable-speed speed increaser control device including a moving portion controller which moves the moving portion in the axial direction and brings the claws of the disk-shape members into contact with each other, and an engagement promotion portion which controls at least one of the constant-speed motor and the variable-speed motor to cause at least one of the constant-speed rotor and the variable-speed rotor to promote an engagement promoting operation, thereby promoting engagement between the disk-shaped members.

In the control device of the variable-speed speed increaser, the engagement promoting operation may be an operation which periodically changes the angular velocity of the variable-speed rotor.

In the control device of the variable-speed speed increaser, the engagement promoting operation may be an operation which periodically changes a rotation direction of the variable-speed rotor.

In the control device of the variable-speed speed increaser, the engagement promoting operation may be an operation which periodically changes an angular velocity of the constant-speed rotor.

In the control device of the variable-speed speed increaser, the engagement promoting operation is an operation which periodically changes a position of the moving portion in the axial direction.

The control device of the variable-speed speed increaser may include an engagement determination portion which determines an engagement state of the engagement portion on the basis of a movement amount of the moving portion and repeats the engagement promoting operation when the movement amount does not reach a threshold value.

According to a third aspect of the present invention, there is provided a control method of a variable-speed speed increaser including a moving portion control step of moving the moving portion in the axial direction and bringing the claws of the disk-shaped members into contact with each other, and an engagement promotion step of controlling at least one of the constant-speed motor and the variable-speed motor to cause at least one of the constant-speed rotor and the variable-speed rotor to promote an engagement promoting operation, thereby promoting engagement between the disk-shaped members.

Advantageous Effects of Invention

According to the present invention, in the variable-speed speed increaser, for example, when the electric power supply to the electric motor is cut off due to an overvoltage, overcurrent, or the like, a driving force of the constant-speed motor transmitted to the transmission device can be disconnected. Thus, it is possible to prevent the variable-speed motor or the driving target from over-rotating due to transmitting the rotation of the constant-speed rotor.

BRIEF DESCRIPTION OF DRAWINGS

FIG. 9 is a cross-sectional view of the clutch mechanism according to the first embodiment of the present invention which shows a state in which engagement of the Hirth coupling is released.

DESCRIPTION OF EMBODIMENTS

First Embodiment

Hereinafter, a variable-speed speed increaser according to a first embodiment of the present invention will be described in detail with reference to the drawings.

Figure 1:
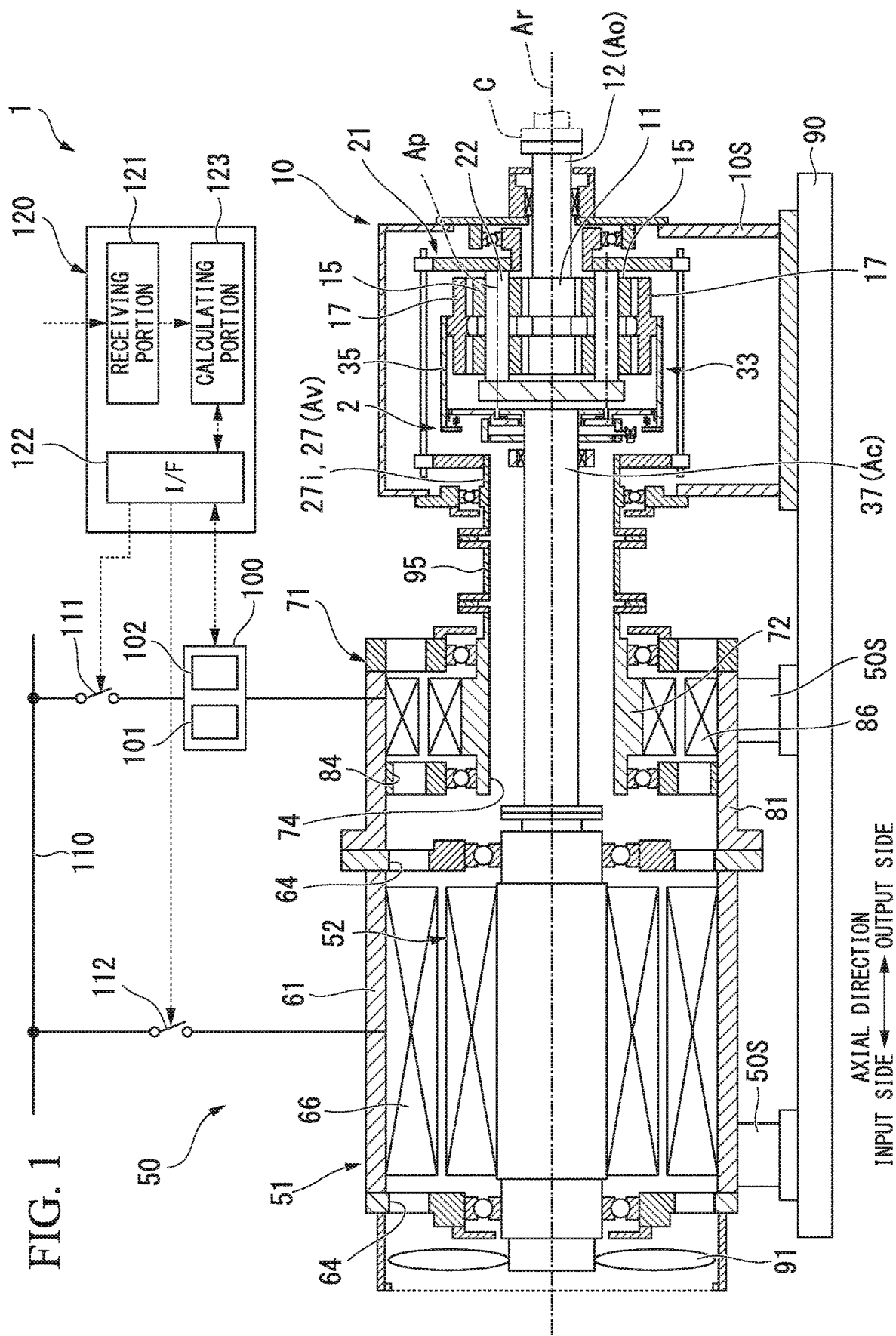
FIG. 1 is a cross-sectional view of a variable-speed speed increaser according to a first embodiment of the present invention.

As shown in FIG. 1, the variable-speed speed increaser 1 of the embodiment includes an electric driving device 50 which generates a rotational driving force, and a transmission device 10 which changes the speed of a rotational driving force generated by the electric driving device 50 and then transmits the speed-changed rotational driving force to a driving target. The variable-speed speed increaser 1 can be applied to, for example, a fluid mechanical system such as a compressor system.

The driving target of the variable-speed speed increaser 1 of the embodiment is a compressor C.

The transmission device 10 is a planetary gear transmission device.

The electric driving device 50 includes a constant-speed motor 51 having a constant-speed rotor 52 which rotates at a constant speed, and a variable-speed motor 71 having a variable-speed rotor 72 which rotates at an arbitrary rotation rate. Each of the constant-speed rotor 52 and the variable-speed rotor 72 is connected to the transmission device 10.

The electric driving device 50 is supported on a frame 90 by an electric driving device support portion 50S. The transmission device 10 is supported on the frame 90 by a transmission device support portion 10S. The electric driving device 50 and the transmission device 10 which are heavy objects can be securely fixed by these support portions.

Figure 2:
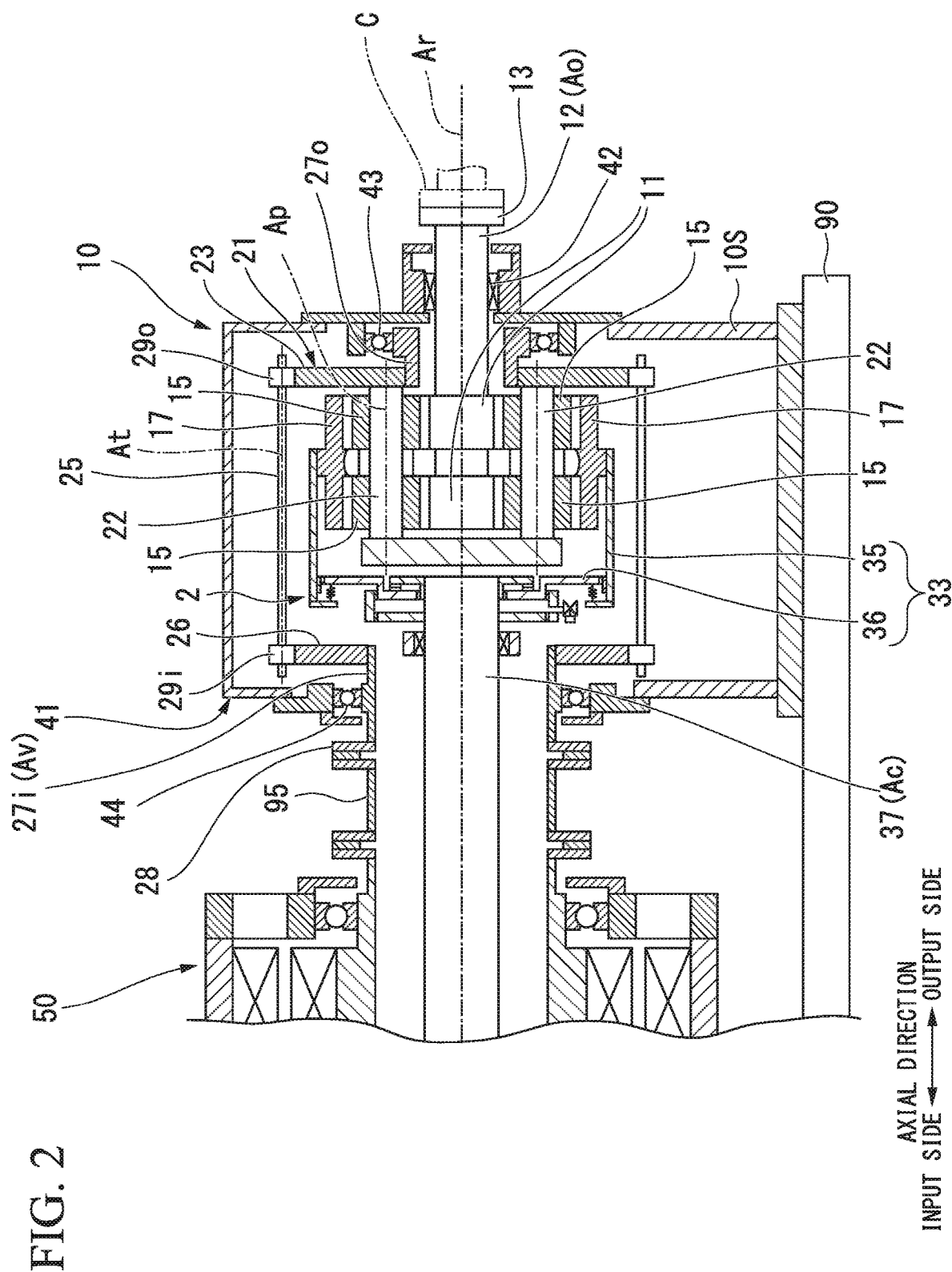
FIG. 2 is a cross-sectional view of a transmission device according to the first embodiment of the present invention.

As shown in FIG. 2, the transmission device 10 includes a sun gear 11 which rotates about an axis Ar extending in a horizontal direction, a sun gear shaft 12 fixed to the sun gear 11, a plurality of planetary gears 15 which mesh with the sun gear 11, revolve around the axis Ar and rotate about their own center lines Ap, an internal gear 17 in which a plurality of teeth are arranged in an annular shape around the axis Ar and which meshes with the plurality of planetary gears 15, a planetary gear carrier 21 which supports the plurality of planetary gears 15 to allow the plurality of planetary gears 15 to revolve around the axis Ar and to rotate about their own center lines Ap, an internal gear carrier 31 which supports the internal gear 17 to allow the internal gear 17 to rotate about the axis Ar, and a transmission casing 41 which covers these elements.

Hereinafter, a direction in which the axis Ar extends is defined as an axial direction, one side in the axial direction is defined as an output side, and a side opposite to the output side is defined as an input side. Also, a radial direction around the axis Ar is simply referred to as a radial direction. In the variable-speed speed increaser 1 of the embodiment, the electric driving device 50 is disposed on the input side in the axial direction, and the transmission device 10 is disposed on the output side of the electric driving device 50. The compressor C is disposed on the output side of the variable-speed speed increaser 1.

The sun gear shaft 12 has a circular column shape centered on the axis Ar and extends from the sun gear 11 toward the output side in the axial direction. A flange 13 is formed at an output-side end of the sun gear shaft 12. For example, a rotor of the compressor C which serves as a driving target is connected to the flange 13. The sun gear shaft 12 is supported to be rotatable about the axis Ar by a sun gear bearing 42 disposed on the output side of the sun gear 11. The sun gear bearing 42 is installed at the transmission casing 41.

The planetary gear carrier 21 includes a planetary gear shaft 22 provided for each of the plurality of planetary gears 15, a carrier main body 23 which fixes the relative positions of the plurality of planetary gear shafts 22, and an output-side planetary gear carrier shaft 27o which extends in the axial direction centered on the axis Ar. The output-side planetary gear carrier shaft 27o is fixed to an inner side of the carrier main body 23 in the radial direction.

The planetary gear shaft 22 passes through the center lines Ap of the planetary gears 15 in the axial direction and supports the planetary gears 15 to allow the planetary gears 15 to rotate about a center line thereof. The carrier main body 23 extends outward in the radial direction from the plurality of planetary gear shafts 22.

The output-side planetary gear carrier shaft 27o extends from the carrier main body 23 toward the output side. The output-side planetary gear carrier shaft 27o is formed in a cylindrical shape centered on the axis Ar.

The output-side planetary gear carrier shaft 27o is supported to be rotatable about the axis Ar by a planetary gear carrier bearing 43. The planetary gear carrier bearing 43 is installed at the transmission casing 41. The sun gear shaft 12 is inserted through the inner circumferential side of the output-side planetary gear carrier shaft 27o.

The transmission device 10 includes an input-side planetary gear carrier shaft 27i which is connected to the variable-speed rotor 72 of the variable-speed motor 71, and a transmitting shaft 25 which transmits rotation of the input-side planetary gear carrier shaft 27i to the planetary gear carrier 21.

The input-side planetary gear carrier shaft 27i is formed in a cylindrical shape centered on the axis Ar. The input-side planetary gear carrier shaft 27i is disposed on the input side of the transmission device 10 and is supported by the planetary gear carrier bearing 44 to be rotatable about the axis Ar. The planetary gear carrier bearing 44 is installed at the transmission casing 41. An internal gear carrier shaft 37 for driving the internal gear carrier 31 of the transmission device 10 is inserted through the inner circumferential side of the input-side planetary gear carrier shaft 27i.

An annular flange 28 which expands outward in the radial direction is formed at the input-side end of the input-side planetary gear carrier shaft 27i. An input-side arm portion 26 which extends outward in the radial direction is formed on the output-side end of the input-side planetary gear carrier shaft 27i.

The transmitting shaft 25 is supported to be rotatable about the axis At. The transmitting shaft 25 is installed at the transmission casing 41 via a bearing (not shown). An input-side transmitting gear 29i and an output-side transmitting gear 29o are fixed to both ends of the transmitting shaft 25.

The input-side transmitting gear 29i meshes with a gear formed on the outer circumference of the input-side arm portion 26. The output-side transmitting gear 29o meshes with a gear formed on the outer circumference of the carrier main body 23. Accordingly, the rotation of the input-side planetary gear carrier shaft 27i is transmitted to the planetary gear carrier 21 via the transmitting shaft 25.

The internal gear carrier 31 includes a carrier main body 33 to which the internal gear 17 is fixed, and the internal gear carrier shaft 37 which is fixed to the carrier main body 33 and extends in the axial direction centered on the axis Ar.

The carrier main body 33 includes a cylindrical portion 35 which has a cylindrical shape centered on the axis Ar and has the internal gear 17 fixed to the inner circumferential side thereof, and a clutch mechanism 2 which connects the input-side end of the cylindrical portion 35 with the output-side end of the internal gear carrier shaft 37.

The clutch mechanism 2 is a mechanism which transmits or blocks the rotation of the internal gear carrier shaft 37 (constant-speed rotor 52) to the cylindrical portion 35.

The internal gear carrier shaft 37 having a column shape around the axis Ar is disposed on the input side of the sun gear shaft 12 (refer to FIG. 2) having a column shape around the axis Ar. The internal gear carrier shaft 37 is inserted through the inner circumferential side of the cylindrical input-side planetary gear carrier shaft 27i (refer to FIG. 2).

The output side of the internal gear carrier shaft 37 is supported by an internal gear carrier bearing 77. The internal gear carrier bearing 77 is a composite bearing in which a radial bearing for receiving a radial load and a thrust bearing for receiving a thrust load are integrated.

The internal gear carrier shaft 37 includes a thrust collar 37a which supports the internal gear carrier bearing 77 in the axial direction. The thrust collar 37a protrudes radially outward from the outer circumferential surface of the internal gear carrier shaft 37.

The clutch mechanism 2 includes a moving portion 36 which is connected to the cylindrical portion 35 to be movable in the axial direction, a drive portion 38 which drives the moving portion 36 in the axial direction, a fixed portion 39 which is fixed to the internal gear carrier shaft 37 (constant-speed rotor 52), and a Hirth coupling 40 (engaging portion) which engages the moving portion 36 with the fixed portion 39 by moving the moving portion 36 in the axial direction.

The drive portion 38 includes a first disk portion 45 (disk) which is disposed on the input side of the moving portion 36 to face the moving portion 36 in the axial direction and forms a first oil supply space S1 between the first disk portion 45 and the moving portion 36, a fixed seal portion 49 which forms the first oil supply space S1 in cooperation with the first disk portion 45 and the moving portion 36, an oil supply portion 57 which supplies a working oil to the first oil supply space S1. The fixed seal portion 49 has a cylindrical shape and is fixed to the transmission casing 41 (refer to FIG. 2).

An oil supply path 78 extending in the radial direction is formed inside the fixed seal portion 49 and the first disk portion 45. An end of the oil supply path 78 on the outer side in the radial direction is opened in the fixed seal portion 49. An end of the oil supply path 78 on the inner side in the radial direction is connected to a nozzle 79 for introducing oil into the first oil supply space S1.

The oil supply portion 57 is provided inside or outside the transmission casing 41 and supplies the working oil to the first oil supply space S1 via a pipe 57a and the oil supply path 78. As the working oil is supplied to the first oil supply space S1, a second disk portion 46 of the moving portion 36 is pressed from the input side by an oil pressure of the working oil. As the second disk portion 46 is pressed from the input side, the moving portion 36 moves to the output side.

The oil supply portion 57 may be an oil supply device which supplies oil to bearings supporting the internal gear carrier shaft 37.

Figure 5:
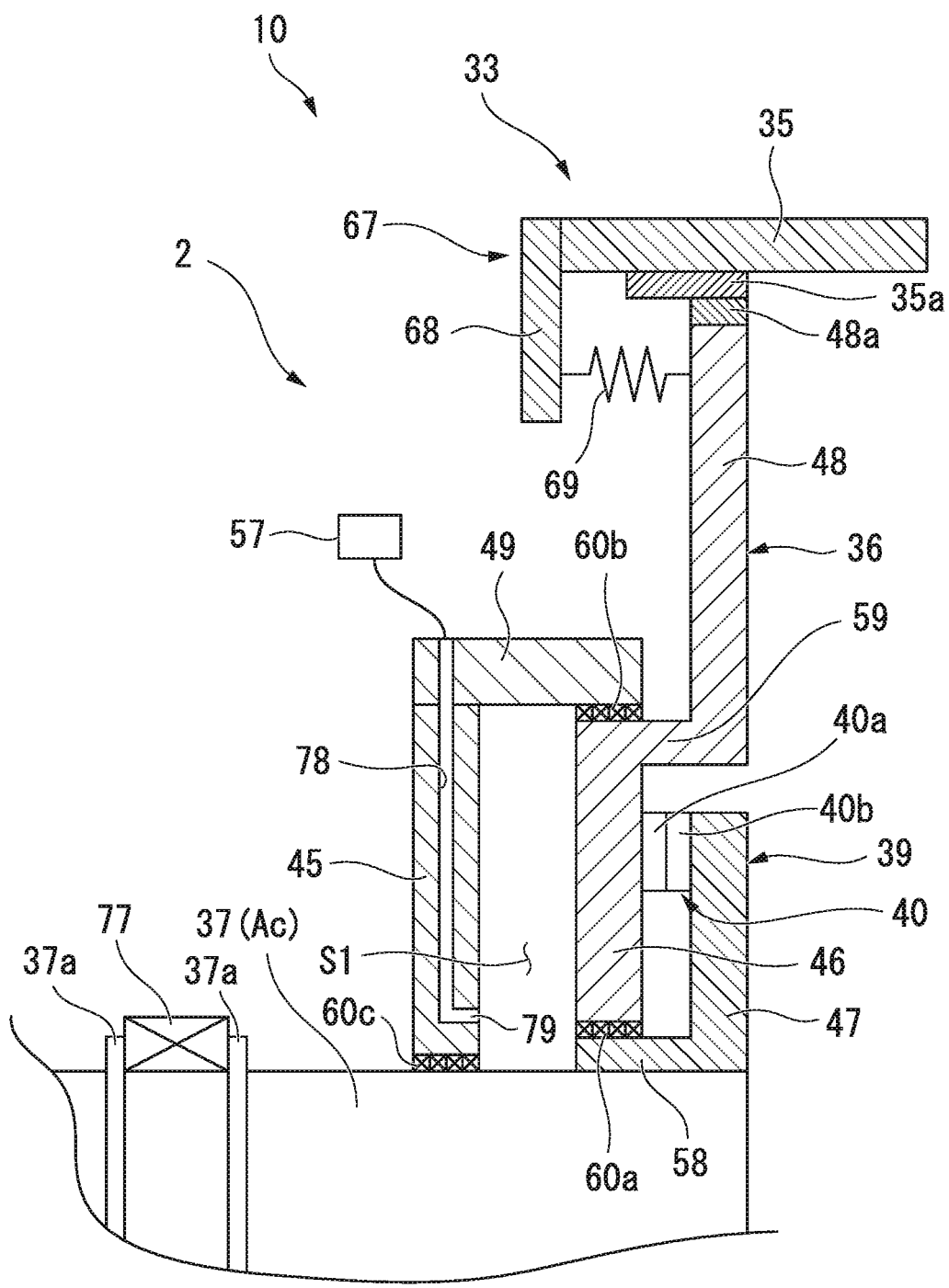
FIG. 5 is a cross-sectional view of a clutch mechanism according to the first embodiment of the present invention.

As shown in FIG. 5, The Hirth coupling 40 includes a first Hirth coupling 40a (disk-shaped member) fixed to the moving portion 36, and a second Hirth coupling 40b (disk-shaped member) fixed to the fixed portion 39.

As the moving portion 36 moves to the output side, the first Hirth coupling 40a and the second Hirth coupling 40b are engaged with each other. The rotation of the internal gear carrier shaft 37 is transmitted to the cylindrical portion 35 via the fixed portion 39 and the moving portion 36 by engaging the first Hirth coupling 40a and the second Hirth coupling 40b.

In a state in which the first Hirth coupling 40a and the second Hirth coupling 40b are not engaged with each other, the rotation of the internal gear carrier shaft 37 is not transmitted to the cylindrical portion 35. That is, in a state in which the moving portion 36 is disposed on the input side and the Hirth coupling 40 is not engaged, the driving force of the constant-speed rotor 52 is not transmitted to the transmission device 10.

Figure 6:
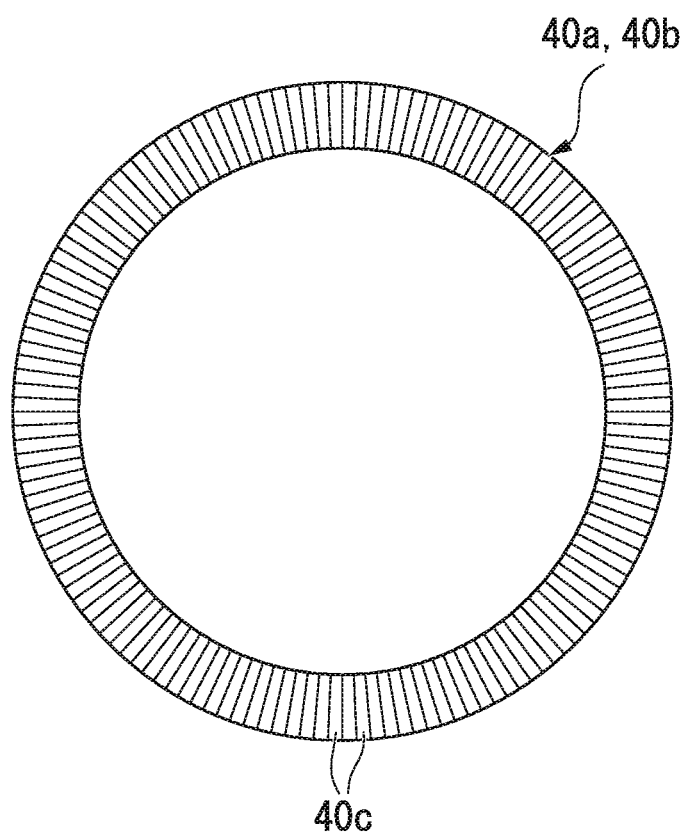
FIG. 6 is a plan view of a Hirth coupling of the first embodiment according to the present invention.
Figure 7:
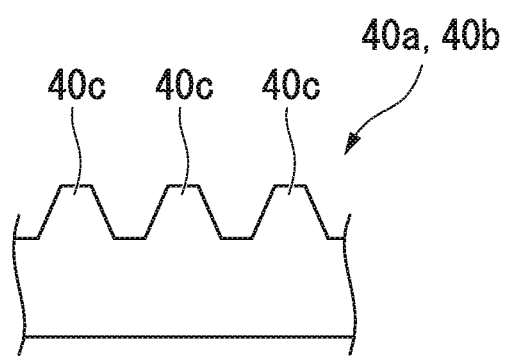
FIG. 7 is a cross-sectional view of the Hirth coupling of the first embodiment according to the present invention.

As shown in FIGS. 6 and 7, the first Hirth coupling 40a and the second Hirth coupling 40b are disk-shaped members which are perforated. A claw 40c having a square (trapezoidal, rectangular wave-like) cross-sectional shape is formed on one surface of each of the first Hirth coupling 40a and the second Hirth coupling 40b. Each claw 40c extends radially. The plurality of claws 40c are formed at regular intervals in the circumferential direction.

As the first Hirth coupling 40a and the second Hirth coupling 40b have such a shape, for example, it is possible to transmit a stronger driving force as compared with a claw having a triangular cross section.

The fixed portion 39 has a disk-shaped third disk portion 47 in which a through-hole is formed at the center thereof and a cylindrical boss portion 58 provided on the inner side of the third disk portion 47 in the radial direction. The second Hirth coupling 40b is fixed to the surface of the third disk portion 47 which faces the input side.

The inner circumferential surface of the boss portion 58 is fixed to the outer circumferential surface of the internal gear carrier shaft 37. The fixed portion 39 is fixed to the output-side end of the internal gear carrier shaft 37 so that the main surface of the third disk portion 47 is orthogonal to the axis Ar.

The moving portion 36 includes the disk-shaped second disk portion 46 having a through-hole formed in the center thereof, a fourth disk portion 48 disposed on the outer side of the second disk portion 46 in the radial direction, and a connecting portion 59 which connects the end of the second disk portion 46 on the outer side in the radial direction with the end of the fourth disk portion 48 on the inner side in the radial direction.

The second disk portion 46 is disposed on the input side of the third disk portion 47 of the fixed portion 39 so that the main surface of the second disk portion 46 and the main surface of the third disk portion 47 are parallel to each other.

A seal member 60a is provided between the inner circumferential surface of the second disk portion 46 and the outer circumferential surface of the boss portion 58. The seal member 60a is, for example, a gland packing having a function of restricting the working oil from flowing out of the first oil supply space S1.

The first Hirth coupling 40a is fixed to a surface of the second disk portion 46 which faces the output side. A seal member 60b is provided between the outer circumferential surface of the second disk portion 46 and the inner circumferential surface of the fixed seal portion 49.

The connecting portion 59 protrudes to the output side from the end of the second disk portion 46 on the outer side in the radial direction. The outer circumferential surface of the fourth disk portion 48 is connected to the inner circumferential surface of the cylindrical portion 35 to be movable in the axial direction.

The fourth disk portion 48 and the cylindrical portion 35 are connected to each other not to move relative to each other in the circumferential direction. Specifically, a first spur gear 48a which has linear teeth parallel to the axis Ar is formed on the outer circumferential surface of the fourth disk portion 48, and a second spur gear 35a which meshes with the first spur gear 48a of the fourth disk portion 48 is formed on the inner circumferential surface of the cylindrical portion 35. The fourth disk portion 48 (moving portion 36) moves in the axial direction as the first spur gear 48a moves on the second spur gear 35a.

The moving portion 36 is biased toward the input side by a biasing mechanism 67. The biasing mechanism 67 includes a plurality of spring fixing members 68 fixed to the input-side end of the cylindrical portion 35, and a plurality of tension coil springs 69. The plurality of spring fixing members 68 are fixed at intervals in the circumferential direction.

The spring fixing members 68 protrude radially inward from the inner circumferential surface of the cylindrical portion 35. The spring fixing members 68 are disposed on the input side of the fourth disk portion 48. The tension coil spring 69 connects the spring fixing member 68 with the fourth disk portion 48. The moving portion 36 is biased toward the input side by the tension coil springs 69.

The first disk portion 45 is disposed on the input side of the second disk portion 46 of the moving portion 36 so that the main surface of the first disk portion 45 and the main surface of the second disk portion 46 are parallel to each other. The outer circumferential surface of the first disk portion 45 is fixed to the inner circumferential surface of the fixed seal portion 49.

A seal member 60c is provided between the inner circumferential surface of the first disk portion 45 and the outer circumferential surface of the internal gear carrier shaft 37.

The first oil supply space S1 is an enclosed space formed by the first disk portion 45, the second disk portion 46, and the fixed seal portion 49. As the moving portion 36 moves in the axial direction, a volume of the first oil supply space S1 increases or decreases. That is, as the moving portion 36 moves to the input side, the volume of the first oil supply space S1 increases, and as the moving portion 36 moves to the output side, the volume of the first oil supply space S1 decreases.

Figure 4:
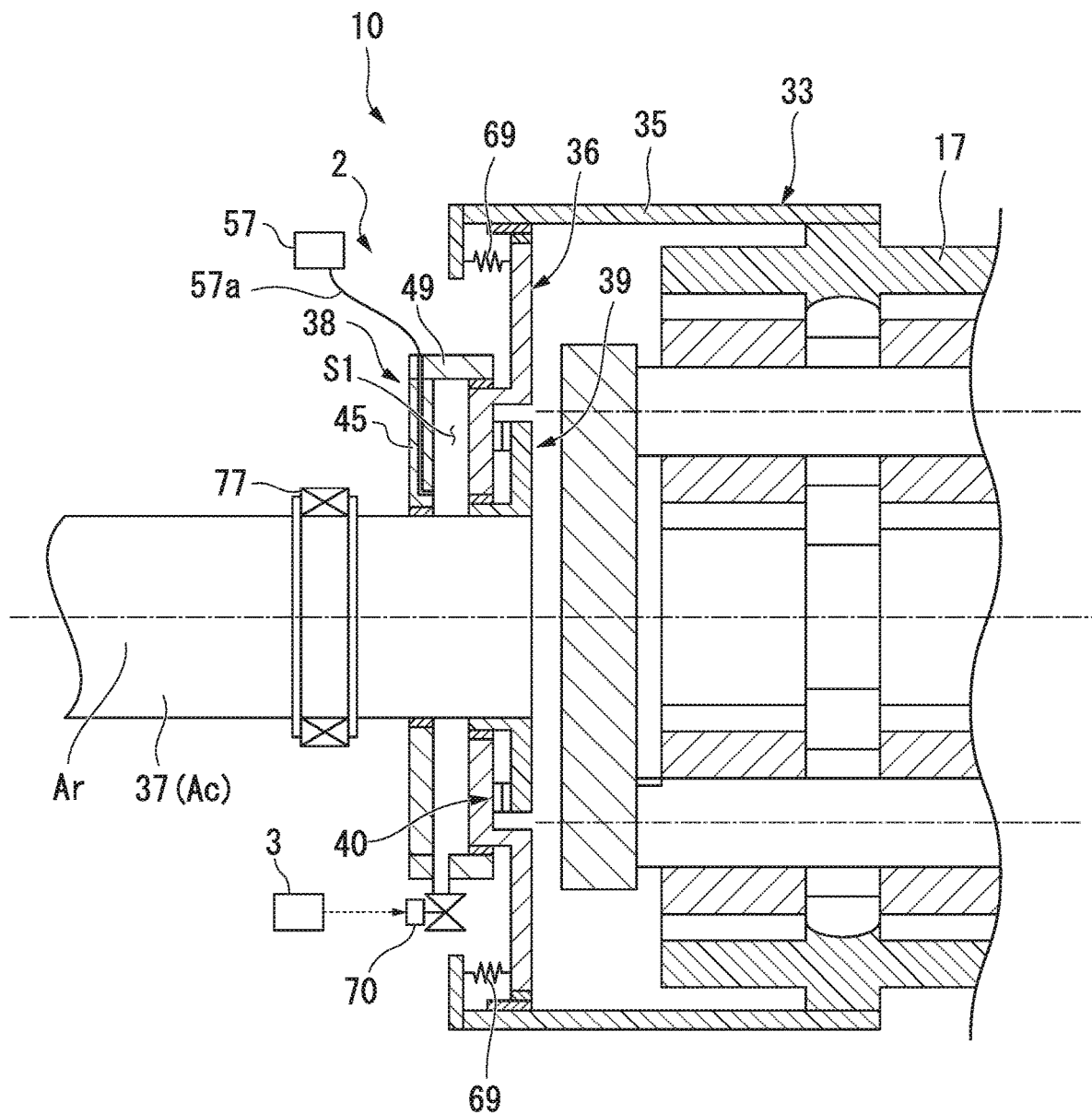
FIG. 4 is a cross-sectional view of an internal gear carrier according to the first embodiment of the present invention.

As shown in FIG. 4, an oil discharge mechanism 70 (oil discharge portion) for discharging the working oil in the first oil supply space S1 is provided at the lower end of the fixed seal portion 49. The oil discharge mechanism 70 includes a valve which can be controlled by a control device 3.

Figure 3:
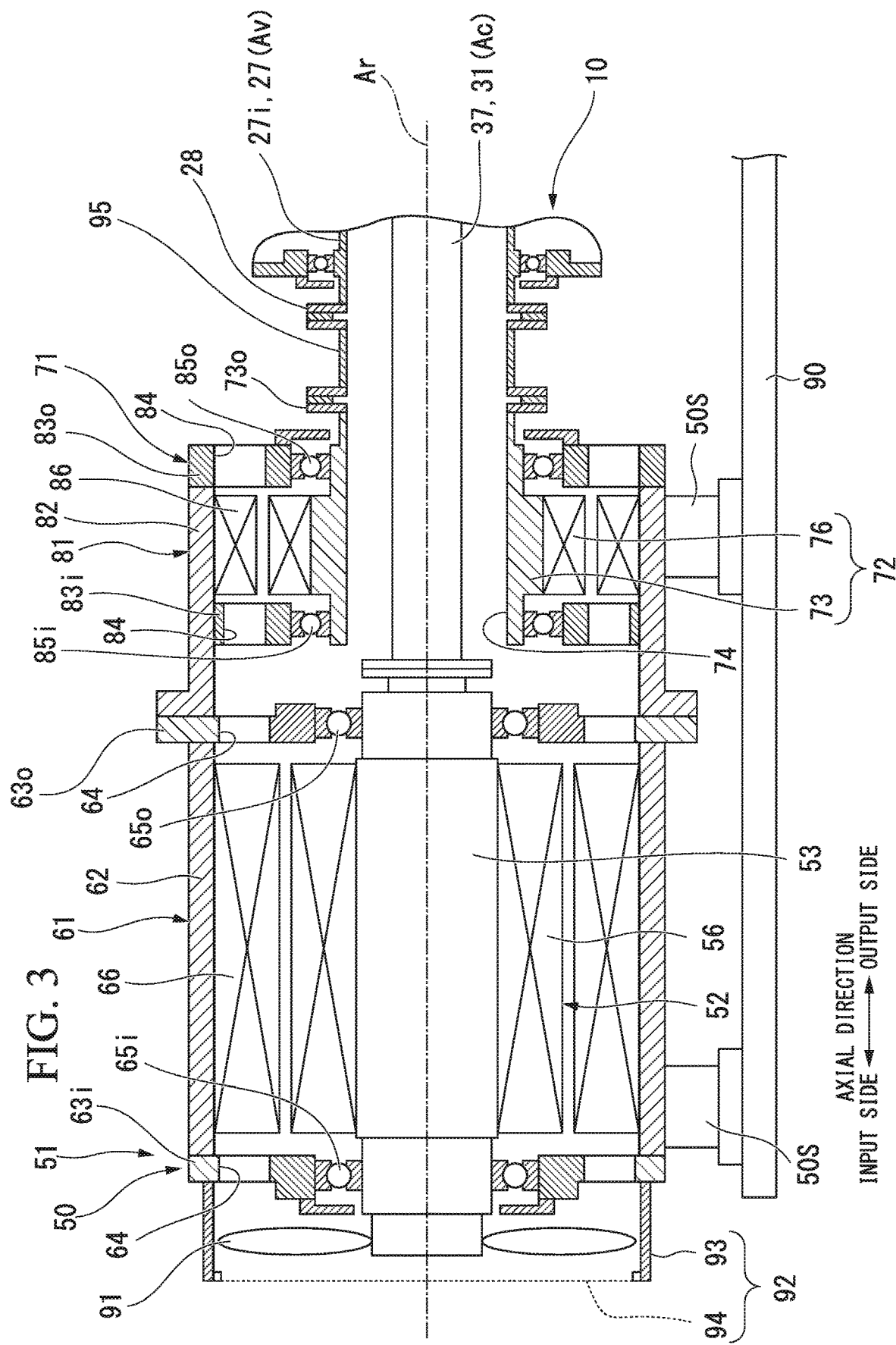
FIG. 3 is a cross-sectional view of an electric driving device according to the first embodiment of the present invention.

As shown in FIG. 3, the constant-speed motor 51 rotationally drives the internal gear carrier shaft 37 of the transmission device 10. The variable-speed motor 71 rotationally drives the input-side planetary gear carrier shaft 27i of the transmission device 10. The electric driving device 50 has a cooling fan 91 which cools the constant-speed motor 51 and a fan cover 92 which covers the cooling fan 91.

The internal gear carrier shaft 37 is a constant-speed input shaft Ac which rotates at a constant speed under a driving force of the constant-speed motor 51. The input-side planetary gear carrier shaft 27i is a variable speed input shaft Av which rotates at an arbitrary rotation rate under a driving force of the variable-speed motor 71.

The variable-speed speed increaser 1 can change the rotation rate of an output shaft Ao of the transmission device 10 connected to the driving target by changing the rotation rate of the variable-speed motor 71.

In the embodiment, the constant-speed motor 51 is, for example, a four-pole three-phase induction motor. Further, the variable-speed motor 71 is an eight-pole three-phase induction motor having more poles than the constant-speed motor 51. The specifications of the constant-speed motor 51 and the variable-speed motor 71 are not limited to these and can be appropriately changed.

The constant-speed motor 51 includes a constant-speed rotor 52 which rotates about the axis Ar and is connected to the internal gear carrier shaft 37 which is the constant-speed input shaft Ac of the transmission device 10, a constant-speed stator 66 disposed on the outer circumferential side of the constant-speed rotor 52, and a constant-speed motor casing 61 in which the constant-speed stator 66 is fixed to the inner circumferential side thereof.

The constant-speed rotor 52 includes a constant-speed rotor shaft 53 which has a column shape around the axis Ar, and a conductive body 56 fixed to the outer circumference of the constant-speed rotor shaft 53. The cooling fan 91 is fixed to the input side end of the constant-speed rotor shaft 53.

The constant-speed stator 66 is disposed radially outward from the conductive body 56 of the constant-speed rotor 52. This constant-speed stator 66 is formed of a plurality of coils.

The constant-speed motor casing 61 includes a casing main body 62 having a cylindrical shape centered on the axis Ar and in which the constant-speed stator 66 is fixed to the inner circumferential side thereof, and covers 63i and 63o which close both axial ends of the cylindrical casing main body 62. Constant-speed rotor bearings 65i and 65o are installed at the respective covers 63i and 63o to rotatably support the constant-speed rotor shaft 53 about the axis Ar. A plurality of openings 64 axially passing through the respective covers 63i and 63o at positions radially outward from the constant-speed rotor bearing 65i are formed in the respective covers 63i and 63o.

The input-side end of the constant-speed rotor shaft 53 protrudes toward the input side from the input-side cover 63i of the constant-speed motor casing 61. The cooling fan 91 is fixed to the input-side end of the constant-speed rotor shaft 53.

When the constant-speed rotor 52 rotates, the cooling fan 91 also rotates integrally with the constant-speed rotor 52. The fan cover 92 includes a cylindrical cover main body 93 disposed on the outer circumferential side of the cooling fan 91, and an air circulating plate 94 installed at an opening of the cover main body 93 on the inlet side and having a plurality of air holes formed therein. The fan cover 92 is fixed to the cover 63i of the constant-speed motor casing 61 on the input side.

The variable-speed motor 71 includes a variable-speed rotor 72 which rotates about the axis Ar and is connected to the input-side planetary gear carrier shaft 27i which is the variable-speed input shaft Av, a variable-speed stator 86 disposed on the outer circumferential side of the variable-speed rotor 72, and a variable-speed motor casing 81 in which the variable-speed stator 86 is fixed to the inner circumferential side thereof.

The variable-speed rotor 72 has a variable-speed rotor shaft 73 and a conductive body 76 fixed to the outer circumference of the variable-speed rotor shaft 73. The variable-speed rotor shaft 73 has a cylindrical shape around the axis Ar and has a shaft insertion hole 74 passing through the variable-speed rotor shaft 73 in the axial direction. The internal gear carrier shaft 37 as the constant-speed input shaft Ac is inserted through the shaft insertion hole 74 of the variable-speed rotor shaft 73. An annular flange 73o expanding radially outward is formed at the output-side end of the variable-speed rotor shaft 73.

The variable-speed stator 86 is disposed radially outward from the conductive body 76 of the variable-speed rotor 72. The variable-speed stator 86 is formed of a plurality of coils.

The variable-speed motor casing 81 includes a casing main body 82 having a cylindrical shape around the axis Ar and to the inner circumferential side of which the variable-speed stator 86 is fixed, an output-side cover 83o which closes the output-side end of the cylindrical casing main body 82, and an inlet-side cover 83i disposed on the input side of the variable-speed stator 86 and fixed to the inner circumferential side of the cylindrical casing main body 82. Variable-speed rotor bearings 85i and 85o which rotatably support the variable-speed rotor shaft 73 about the axis Ar are installed at the respective covers 83i and 83o. In the respective covers 83i and 83o, a plurality of openings 84 passing through the respective covers 83i and 83o in the axial direction are formed at positions radially outward from the variable-speed rotor bearings 85i and 85o.

A space in the variable-speed motor casing 81 and a space in the constant-speed motor casing 61 communicate with each other through the plurality of openings 84 formed in the respective covers 83i and 83o of the variable-speed motor casing 81 and the plurality of openings 64 formed in the respective covers 63i and 63o of the constant-speed motor casing 61.

The variable-speed speed increaser 1 of the embodiment includes a variable-speed flexible coupling 95 which is disposed between the input-side planetary gear carrier shaft 27i which is the variable-speed input shaft Av and the variable-speed rotor 72 and connects them.

Further, in the variable-speed speed increaser 1 of the embodiment, the constant-speed rotor 52, the variable-speed rotor 72 and the sun gear shaft 12 are arranged on the same axis.

Figure 8:
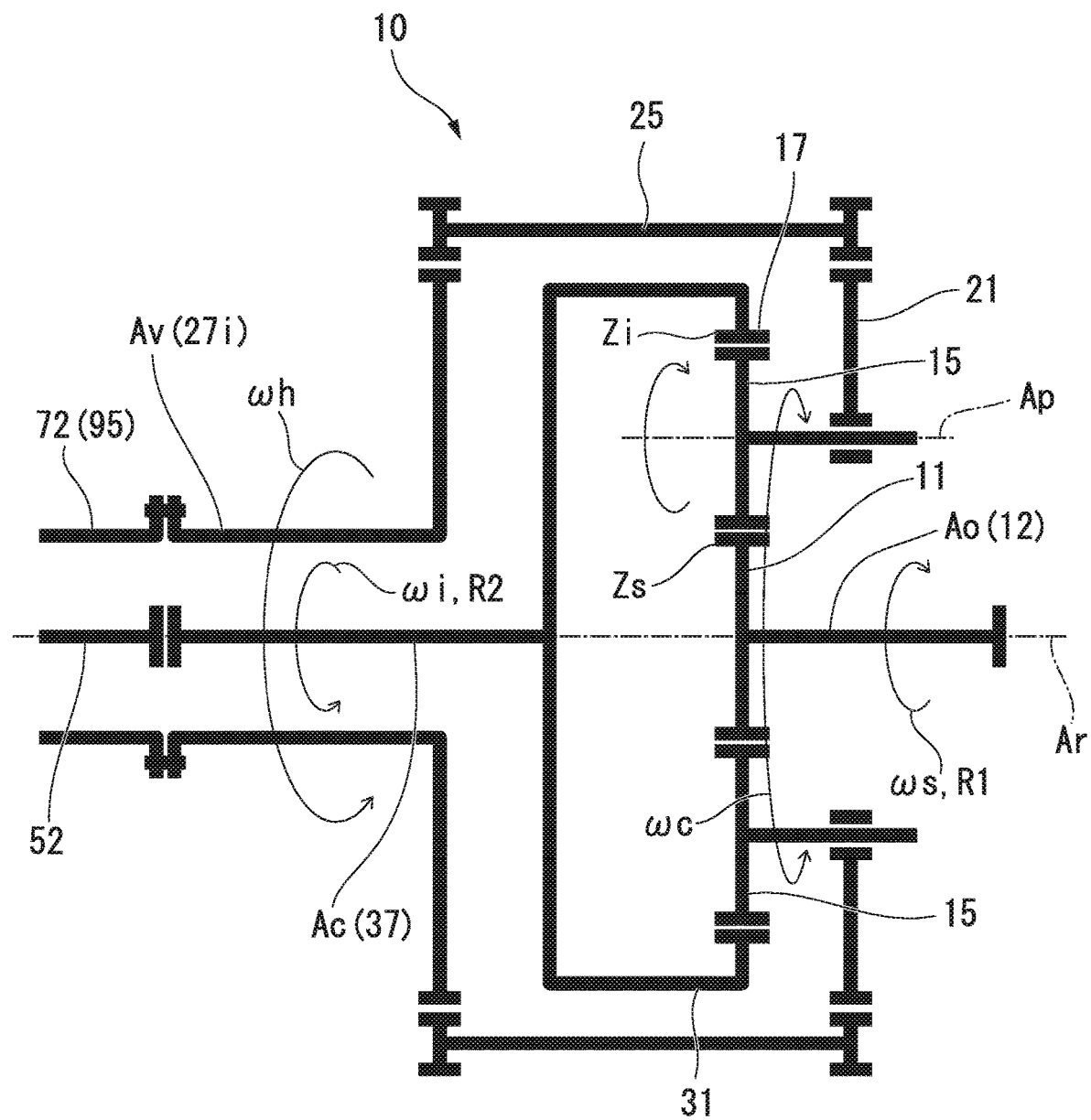
FIG. 8 is a schematic diagram showing a constitution of a transmission device according to the first embodiment of the present invention.

As shown in FIG. 8, the constant-speed motor 51 is set to rotate the constant-speed rotor 52 (internal gear 17) in the second direction R2 in the circumferential direction of the axis Ar by supplying the electric power to the constant-speed motor 51. As the constant-speed rotor 52 rotates in the second direction R2, the internal gear carrier shaft 37 and the internal gear carrier 31 rotate in the second direction R2.

The output shaft Ao of the transmission device 10 is set to rotate in the first direction R1 opposite to the second direction R2 by the constant-speed rotor 52 of the constant-speed motor 51 rotating at the maximum rotation rate in the second direction R2. That is, the forward rotation of the constant-speed motor 51 is the second direction R2, and the forward rotation of the output shaft Ao of the transmission device 10 is the first direction R1. The compressor C operates normally as the output shaft Ao rotates forward.

In the following description, the rotation direction of the first direction R1 is referred to as a positive rotation direction, and the rotation direction of the second direction R2 is referred to as a negative rotation direction. For example, the maximum rotation rate of the constant-speed motor 51 is −1800 rpm.

The variable-speed motor 71 rotationally drives the variable-speed rotor 72 (planetary gear carrier 21) in the first direction R1 and the second direction R2 which are the circumferential directions of the axis Ar. That is, the variable-speed motor 71 can rotate forward and in reverse.

The variable-speed motor 71 serves as a generator by rotating the variable-speed rotor 72 by an external force. A state in which the variable-speed motor 71 serves as a generator is referred to as a generator mode.

The variable-speed motor 71 serves as an electric motor by supplying the electric power. A state in which the variable-speed motor 71 serves as an electric motor is referred to as an electric motor mode.

As the variable-speed rotor 72 rotates in the first direction R1, the planetary gear carrier 21 rotates in the first direction R1.

The variable-speed speed increaser 1 of the embodiment includes a rotation rate controller 100 which controls the rotation rate of the variable-speed motor 71, a variable-speed motor switch 111 which sets the variable-speed motor 71 to be in a power supply state and a power cutoff state, a constant-speed motor switch 112 which sets the constant-speed motor 51 to be in the power supply state and the power cutoff state, and a controller 120 which controls operations of the rotation rate controller 100, the variable-speed motor switch 111 and the constant-speed motor switch 112.

The controller 120 is constituted of a computer. The controller 120 includes a receiving portion 121 which directly receives an instruction from an operator or receives an instruction from a host control device, an interface 122 which provides instructions to the variable-speed motor switch 111, the rotation rate controller 100 and the constant-speed motor switch 112, and a calculating portion 123 which creates an instruction for the variable-speed motor switch 111, the constant-speed motor switch 112, and the rotation rate controller 100 according to the instructions received by the receiving portion 121 or the like.

The variable-speed motor switch 111 is electrically connected to a power source line 110 and the rotation rate controller 100. The rotation rate controller 100 is electrically connected to the variable-speed motor 71. The constant-speed motor switch 112 is electrically connected to the power source line 110 and the constant-speed motor 51.

The variable-speed motor switch 111 is turned on by an ON instruction from the controller 120 and turned off by an OFF instruction from the controller 120. When the variable-speed motor switch 111 is turned on, electric power from the power source line 110 is supplied to the variable-speed motor 71 through the rotation rate controller 100, and the variable-speed motor 71 is in the power supply state. When the variable-speed motor switch 111 is turned off, the power supply from the power source line 110 to the rotation rate controller 100 and the variable-speed motor 71 is cut off, and the variable-speed motor 71 is in the power cutoff state.

The constant-speed motor switch 112 is turned on by an ON instruction from the controller 120 and turned off by an OFF instruction from the controller 120. When the constant-speed motor switch 112 is turned on, the electric power from the power source line 110 is supplied to the constant-speed motor 51, and the constant-speed motor 51 is in the power supply state. When the constant-speed motor switch 112 is turned off, the power supply from the power source line 110 to the constant-speed motor 51 is cut off, and the constant-speed motor 51 is in the power cutoff state.

The rotation rate controller 100 includes a frequency conversion portion 101 which changes a frequency of the electric power supplied from the power source line 110, and a rotation direction switching portion 102 which changes a rotation direction of the variable-speed motor 71.

The frequency conversion portion 101 supplies the electric power instructed by the controller 120 to the variable-speed motor 71. The variable-speed rotor 72 of the variable-speed motor 71 rotates at a rotation rate corresponding to this frequency. Since the rotation rate of the variable-speed rotor 72 changes in this manner, the rotation rate of the planetary gear carrier 21 of the transmission device 10 connected to the variable-speed rotor 72 also changes. As a result, the rotation rate of the sun gear shaft 12 which is the output shaft Ao of the transmission device 10 also changes.

The rotation direction switching portion 102 is a device which changes the rotation direction of the variable-speed motor 71 by using a circuit for switching a plurality of (three in the case of the embodiment) power source lines connected to the variable-speed motor 71. That is, the rotation direction switching portion 102 can rotate the variable-speed rotor 72 forward and in reverse.

Here, the relationship between the number of teeth of each gear of the transmission device 10 and the rotation rate of each shaft of the transmission device 10 will be described with reference to FIG. 8.

The rotation rate of the sun gear shaft 12 as the output shaft Ao is indicated by $\omega s$, the rotation rate of the internal gear carrier shaft 37 (constant-speed motor 51) that is the constant-speed input shaft Ac is indicated by $\omega i$, and the rotation rate of the input-side planetary gear carrier shaft 27$i$ (variable-speed motor 71) that is the variable-speed input shaft Av is indicated by $\omega h$. Further, the number of teeth of the sun gear 11 is indicated by Zs, and the number of teeth of the internal gear 17 is indicated by Zi.

Also, a ratio $\omega s/\omega i$ of the rotation rate $\omega s$ of the output shaft Ao to the rotation rate $\omega i$ of the constant-speed motor 51 is indicated by U. The ratio U of the rotation rate $\omega s$ of the output shaft Ao to the rotation rate $\omega i$ of the constant-speed motor 51 is the same as a ratio Zi/Zs of the number of teeth Zi of the internal gear 17 to the number of teeth Zs of the sun gear 11.

Also, a ratio $\omega c/\omega h$ of the rotation rate $\omega c$ of the planetary gear carrier 21 to the rotation rate $\omega h$ of the variable-speed motor 71 is indicated by P.

The relationship between the number of teeth of each gear and the rotation rate of each shaft in the transmission device 10 can be expressed by the following Formula (1):

$$\omega s/\omega i = P \times \omega h/\omega i - (1 P \times \omega h/\omega i) \times U \tag{1}$$

When the constant-speed motor 51 is a four-pole induction motor and the power source frequency is 60 Hz, the rotation rate $\omega i$ (rated rotation rate) of the constant-speed rotor 52 (constant-speed input shaft Ac) is −1,800 rpm. Further, when the variable-speed motor 71 is an eight-pole induction motor and the power source frequency is 60 Hz, the maximum rotation rate $\omega h$ (rated rotation rate) of the variable-speed rotor 72 (variable-speed input shaft Av) is 900 rpm.

Further, the ratio U of the rotation rate $\omega s$ of the output shaft Ao to the rotation rate $\omega i$ of the constant-speed motor 51 (ratio Zi/Zs of the number of teeth Zs of the sun gear 11 to the number of teeth Zi of the internal gear 17) is set to 4.

Furthermore, the ratio P of the rotation rate $\omega c$ of the planetary gear carrier 21 to the rotation rate $\omega h$ of the variable-speed motor 71 is set to 0.3.

In this case, when the rotation direction of the constant-speed rotor 52 (internal gear 17) is the rotation (−1,800 rpm) in the second direction R2 and the rotation direction of the variable-speed rotor 72 (planetary gear carrier 21) has the maximum rotation rate (900 rpm) in a direction opposite to the rotation of the constant-speed rotor 52 (rotation in the first direction R1), the rotation rate $\omega s$ of the sun gear shaft 12 which is the output shaft Ao is 11,700 rpm. This rotation rate (11,700 rpm) is the maximum rotation rate of the sun gear shaft 12.

That is, in the transmission device 10 of the embodiment, the rotation rate $\omega s$ of the output shaft Ao becomes the maximum rotation rate when the internal gear 17 corresponding to the constant-speed input shaft Ac rotates at −1,800 rpm and the planetary gear carrier 21 corresponding to the variable-speed input shaft Av rotates at 900 rpm.

Assuming that a variable speed range of the variable-speed input shaft Av is from −900 rpm to +900 rpm, the rotation rate $\omega s$ of the output shaft Ao lowers as the rotation rate of the variable-speed input shaft Av approaches −900 rpm.

Next, the operation of the variable-speed speed increaser 1 of the embodiment will be described.

The variable-speed speed increaser 1 of the embodiment can prevent the driving force of the constant-speed motor 51 from being transmitted to the transmission device 10 using the clutch mechanism 2.

As shown in FIG. 5, during a normal operation, the driving force of the constant-speed motor 51 (refer to FIG. 1) is transmitted to the transmission device 10 by the clutch mechanism 2. During the normal operation, the working oil is supplied from the oil supply portion 57 (refer to FIG. 4) to the first oil supply space S1, and the moving portion 36 is moved to the output side. As the moving portion 36 moves to the output side, the first Hirth coupling 40$a$ and the second Hirth coupling 40$b$ constituting the Hirth coupling 40 are engaged. Accordingly, the driving force of the constant-speed motor 51 is transmitted to the cylindrical portion 35 via the constant-speed rotor 52 (refer to FIG. 1), the internal gear carrier shaft 37, the fixed portion 39 and the moving portion 36.

As shown in FIG. 9, when the clutch mechanism 2 is used to prevent the driving force of the constant-speed motor 51 from being transmitted to the transmission device 10, the control device 3 controls the oil discharge mechanism 70 (refer to FIG. 4) to discharge the working oil in the first oil supply space S1. Therefore, the moving portion 36 moves to the input side. As the moving portion 36 moves to the input side, the first Hirth coupling 40*a* and the second Hirth coupling 40*b* are separated from each other, and the driving force on the side of the constant-speed rotor 52 is not transmitted to the cylindrical portion 35.

According to the embodiment, in the variable-speed speed increaser 1, for example, when the power supply to the electric motor is cut off due to overvoltage, overcurrent, or the like, the driving force of the constant-speed motor 51 transmitted to the transmission device 10 can be disconnected.

Accordingly, over-rotation of the variable-speed motor 71 or the compressor C which is the driving target can be prevented by the rotation of the constant-speed rotor 52 being transmitted.

Further, it is possible to move the moving portion 36 using oil supplied to the bearings by adopting a configuration in which the moving portion 36 is moved by the oil pressure. Furthermore, it is possible to release the engagement by the Hirth coupling 40 by discharging the oil from the first oil supply space S1.

In addition, in the embodiment, the internal gear carrier shaft 37 which is a rod-shaped shaft is inserted through the variable-speed rotor shaft 73 which is a cylindrical shaft in which the shaft insertion hole 74 is formed. That is, the constant-speed input shaft Ac having a large output is inserted through the variable-speed rotor shaft 73 of the variable-speed motor 71 having a smaller output than the constant-speed motor 51. Accordingly, as the constant-speed motor 51, one having a larger output (horsepower) can be adopted.

Further, in the embodiment, the whole apparatus can be made more compact by arranging the constant-speed motor 51, the variable-speed motor 71, the transmission device and the compressor C linearly in this order.

Second Embodiment

Hereinafter, a variable-speed speed increaser according to a second embodiment of the present invention will be described in detail with reference to the drawings. In this embodiment, differences from the above-described first embodiment will be mainly described, and a description of similar portions will be omitted.

Figure 10:
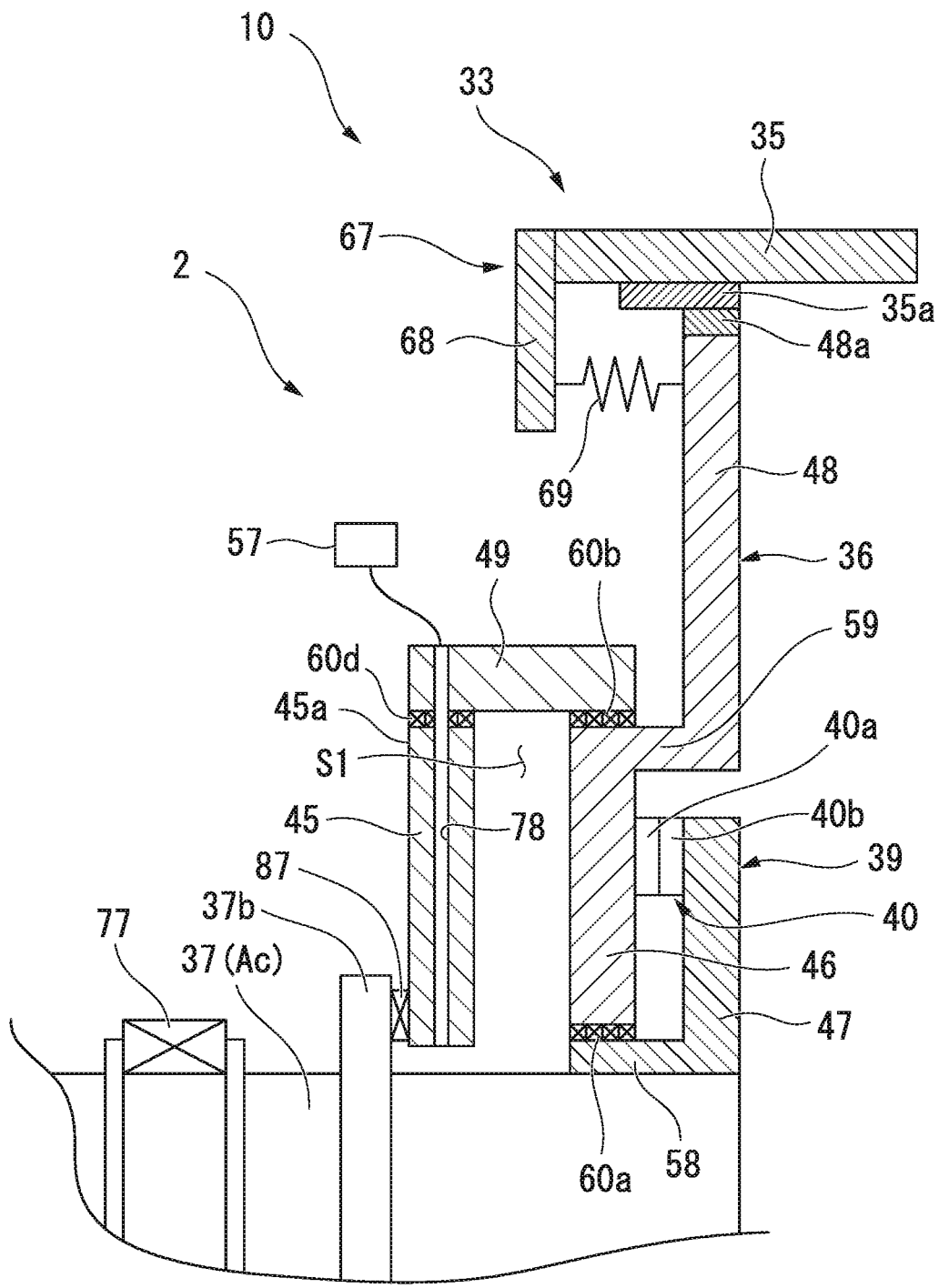
FIG. 10 is a cross-sectional view of a clutch mechanism according to a second embodiment of the present invention.

As shown in FIG. 10, the first disk portion 45 of the variable-speed speed increaser according to the embodiment is movable in the axial direction like the moving portion 36.

The first disk portion 45 is connected to the transmission casing 41 (refer to FIG. 2) via a rail (not shown). The first disk portion moves along the rail in the axial direction.

A thrust collar 37*b* is formed on the internal gear carrier shaft 37, and a surface 45*a* facing the input side of the first disk portion 45 is supported by the thrust collar 37*b* via a thrust bearing 87.

An opening (nozzle) of the oil supply path 78 on the inner side in the radial direction is provided in the inner circumferential surface of the first disk portion 45. A seal member 60*d* is provided between the outer circumferential surface of the first disk portion 45 and the inner circumferential surface of the fixed seal portion 49.

According to the embodiment, the thrust bearing 87 and the thrust collar 37*b* can receive the oil pressure applied to the first oil supply space S1 by allowing the first disk portion 45 to be movable in the axial direction. Accordingly, the force applied to the internal gear carrier shaft 37 can be canceled out as the force received by the fixed portion 39 is offset against the force received by the thrust collar 37*b*.

Third Embodiment

Hereinafter, a variable-speed speed increaser according to a third embodiment of the present invention will be described in detail with reference to the drawings. In this embodiment, differences from the above-described first embodiment will be mainly described, and a description of similar portions will be omitted.

Figure 11:
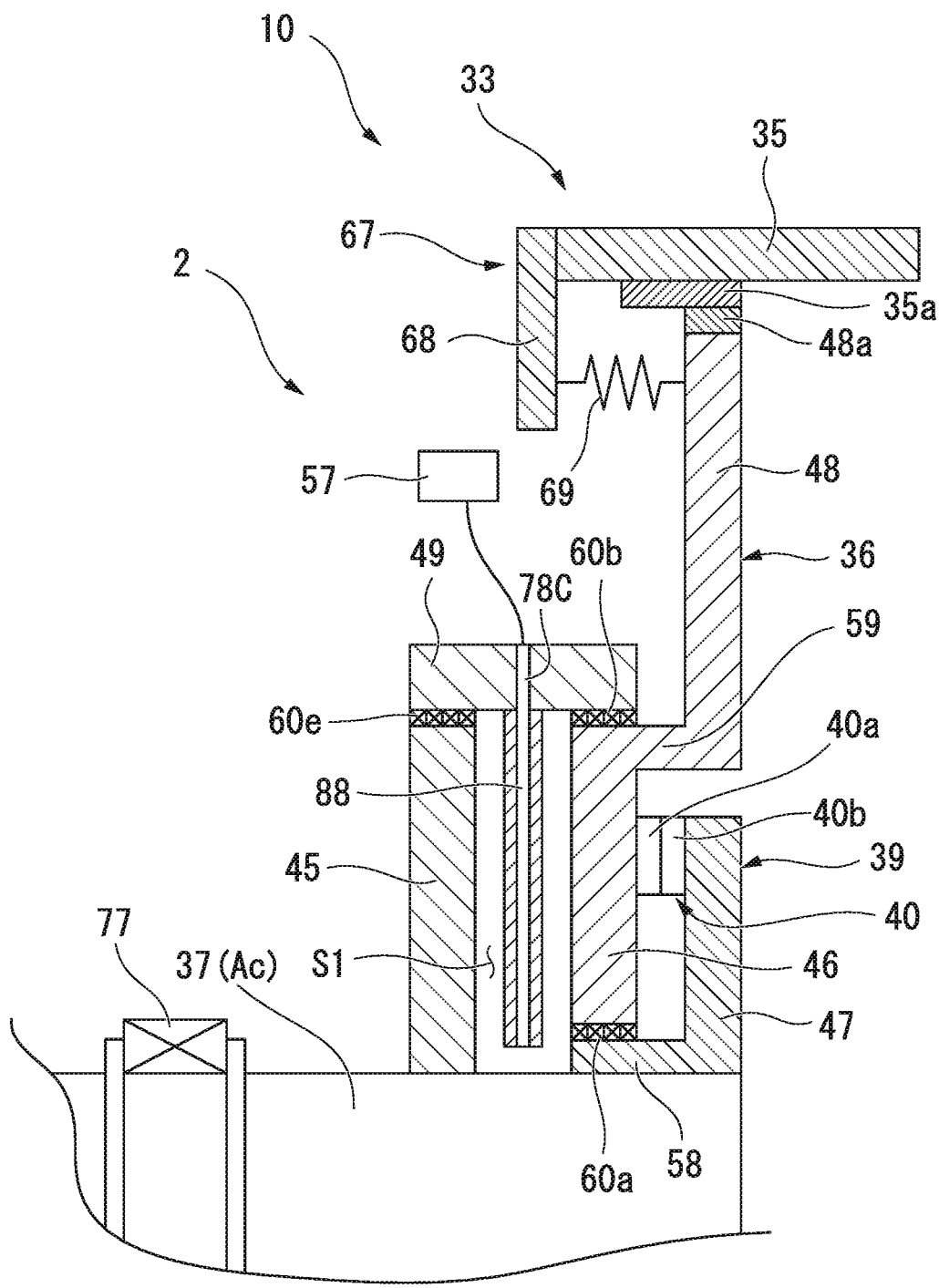
FIG. 11 is a cross-sectional view of a clutch mechanism according to a third embodiment of the present invention.

As shown in FIG. 11, the inner circumferential surface of the first disk portion 45 of the embodiment is fixed to the outer circumferential surface of the internal gear carrier shaft 37. That is, the first disk portion 45 of the embodiment rotates together with the internal gear carrier shaft 37.

A seal member 60*e* is provided between the outer circumferential surface of the first disk portion 45 and the inner circumferential surface of the fixed seal portion 49.

An oil supply path 78C of the embodiment is formed only in the fixed seal portion 49.

An oil supply nozzle 88 is provided inside the first oil supply space S1. Like the fixed seal portion 49, the oil supply nozzle 88 is a fixed member.

The oil supply nozzle 88 has a cylindrical shape and extends in the radial direction. An end of the oil supply nozzle 88 on the outer side in the radial direction is connected to an opening of the oil supply path 78C formed in the inner circumferential surface of the fixed seal portion 49. The oil supply nozzle 88 extends to the vicinity of the outer circumferential surface of the internal gear carrier shaft 37.

According to the embodiment, it is possible to supply oil using the oil supply nozzle 88 from the inner side in the radial direction in which the pressure is lowered rather than the outer side in the radial direction in which the pressure is increased by the centrifugal force applied to the oil.

Fourth Embodiment

Hereinafter, a variable-speed speed increaser according to a fourth embodiment of the present invention will be described in detail with reference to the drawings. In this embodiment, differences from the above-described third embodiment will be mainly described, and s description of similar portions will be omitted.

Figure 12:
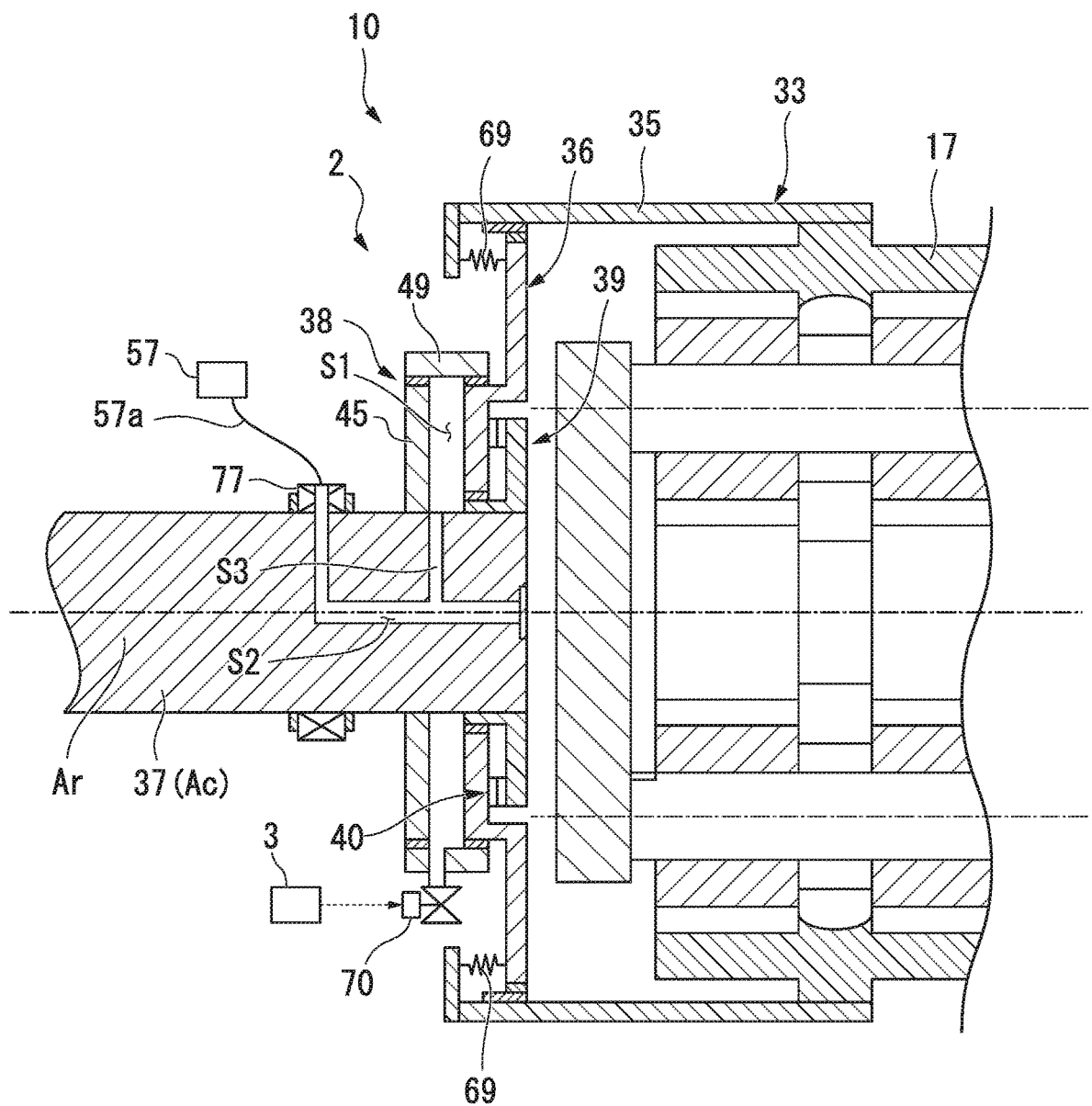
FIG. 12 is a cross-sectional view of an internal gear carrier according to a fourth embodiment of the present invention.

As shown in FIG. 12, a second oil supply space S2 is formed inside the internal gear carrier shaft 37 of the embodiment. The second oil supply space S2 is an enclosed space formed at the output-side end of the internal gear carrier shaft 37. The first oil supply space S1 and the second oil supply space S2 communicate with each other through a communication path S3.

The oil supply portion 57 is provided inside or outside the transmission casing 41 and supplies the working oil to the second oil supply space S2 via a pipe 57*a*. As the working oil is supplied from the oil supply portion 57 to the second oil supply space S2, the working oil is supplied from the radially inner side to the first oil supply space S1 via the communication path S3. As the working fluid is supplied to the first oil supply space S1, the second disk portion 46 of the moving portion 36 is pressed from the input side by the oil pressure of the working oil. The moving portion 36 moves to the output side due to the second disk portion 46 being pressed from the input side.

The oil supply portion 57 may be an oil supply device which supplies oil to the bearings supporting the internal gear carrier shaft 37.

Figure 13:
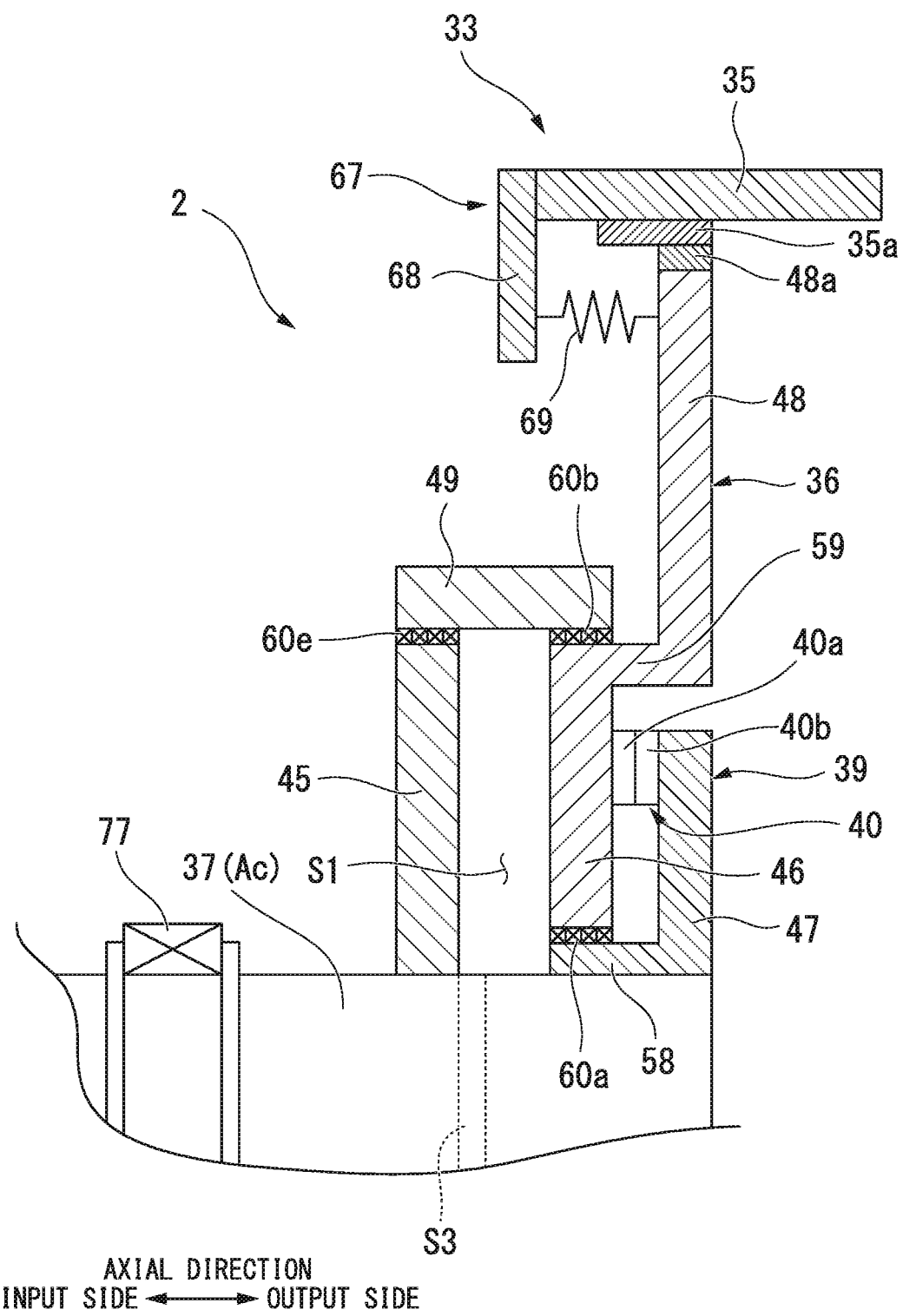
FIG. 13 is a cross-sectional view of a clutch mechanism according to the fourth embodiment of the present invention.

As shown in FIG. 13, during normal operation, the driving force of the constant-speed motor 51 (refer to FIG. 1) is transmitted to the transmission device 10 by the clutch mechanism 2. During normal operation, the working oil is supplied from the oil supply portion 57 (refer to FIG. 4) to the first oil supply space S1 via the second oil supply space S2 and the communication path S3, and the moving portion 36 moves to the output side.

According to the above-described embodiment, due to the constitution in which the oil is supplied from the second oil supply space S2 having a lower pressure rather than the first oil supply space S1 in which the pressure is increased by the centrifugal force applied to the oil, it is possible to easily supply the oil to the oil supply spaces S1 and S2.

Further, according to the above-described embodiment, the moving portion 36 is connected to the cylindrical portion 35 to be movable in the axial direction. However, the present invention is not limited thereto. The moving portion 36 may be connected to the internal gear carrier shaft 37 to be movable in the axial direction. In this case, the fixed portion 39 is fixed to the cylindrical portion 35.

Fifth Embodiment

Hereinafter, a variable-speed speed increaser according to a fifth embodiment of the present invention will be described in detail with reference to the drawings. In this embodiment, differences from the above-described second embodiment will be mainly described, and description of similar portions will be omitted.

Figure 14:
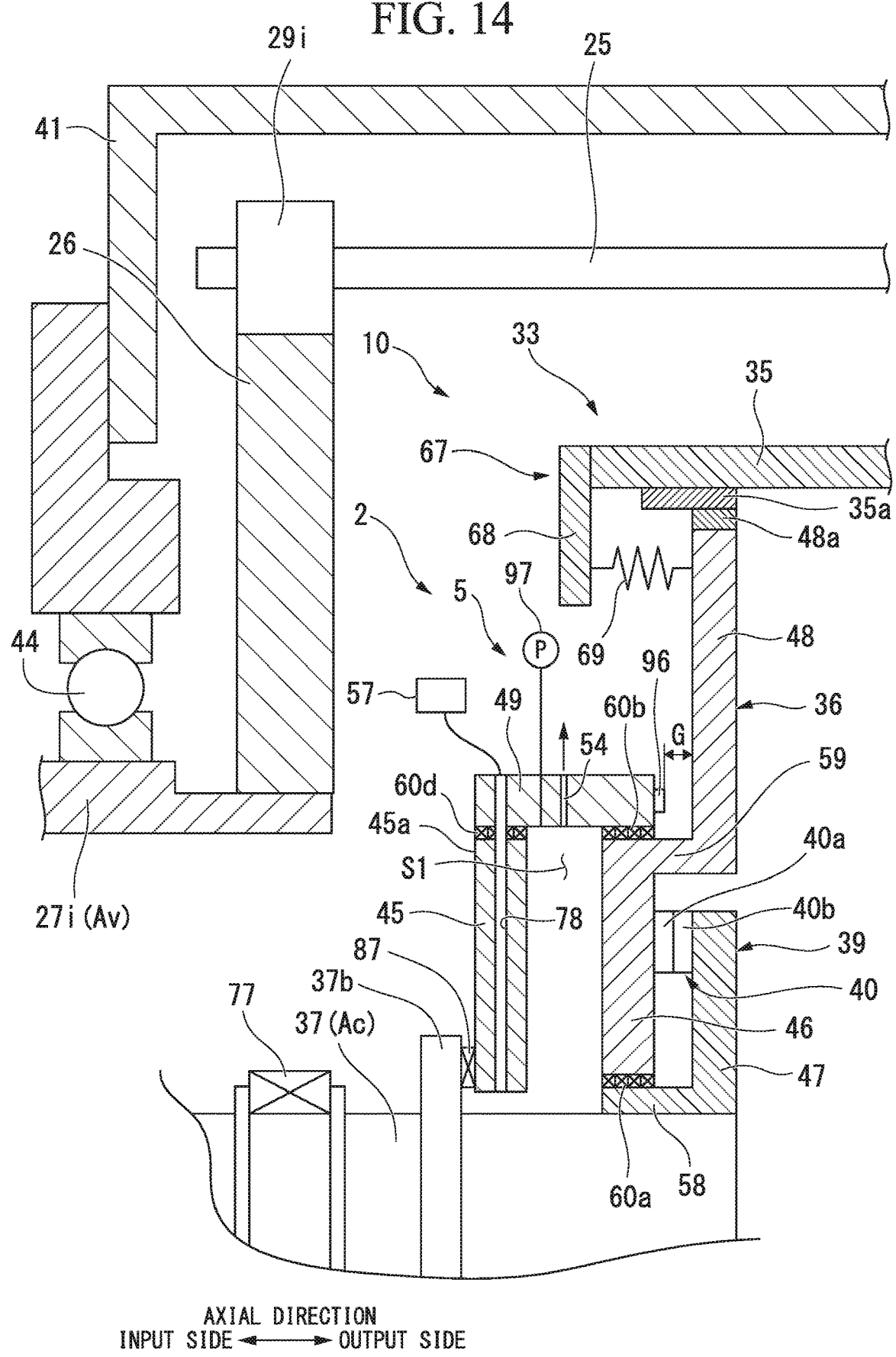
FIG. 14 is a cross-sectional view of a clutch mechanism according to a fifth embodiment of the present invention.

As shown in FIG. 14, the variable-speed speed increaser according to the embodiment includes a circulation system 5 which circulates the working oil supplied to the first oil supply space S1, a displacement sensor 96, and a control device 3E (refer to FIG. 15), in addition to the constitution of the variable-speed speed increaser of the second embodiment.

The control device 3E controls the variable-speed speed increaser. The control device 3E is constituted, for example, using a computer.

Figure 15:
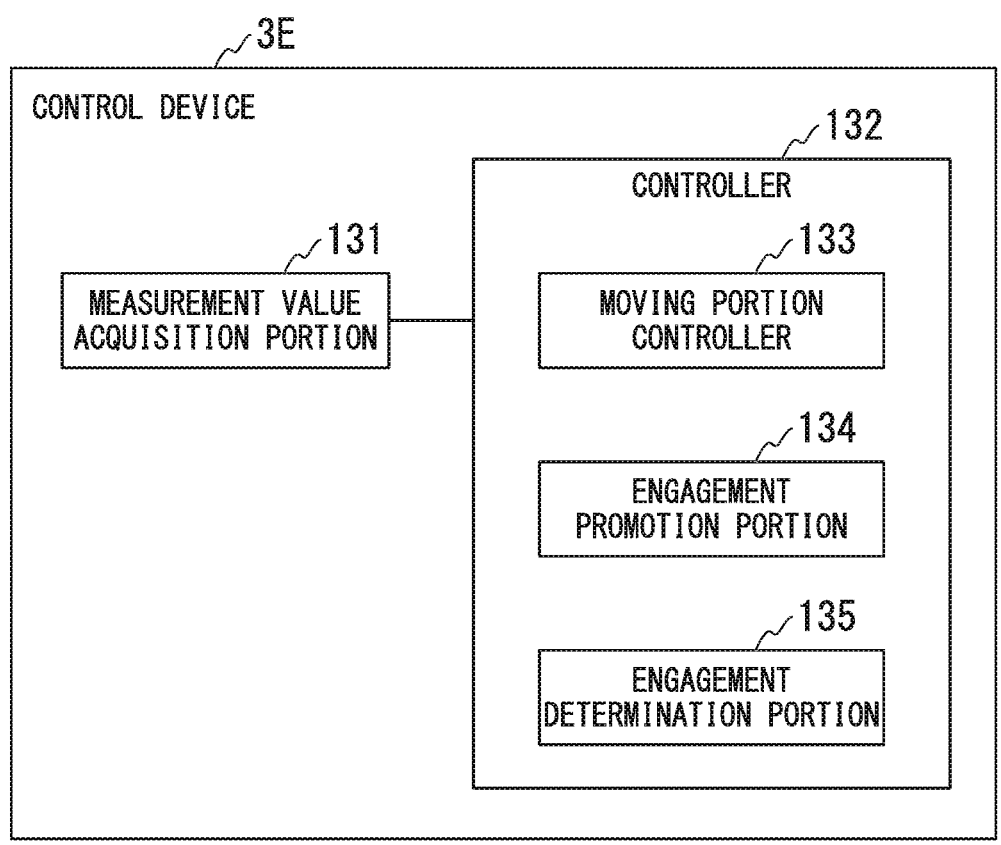
FIG. 15 is a schematic block diagram showing a functional constitution of a variable-speed speed increaser control device according to the fifth embodiment of the present invention.

FIG. 15 is a schematic block diagram showing a functional constitution of the control device 3E. As shown in FIG. 15, the control device 3E includes a measurement value acquisition portion 131 and a controller 132. The controller 132 includes a moving portion controller 133, an engagement promotion portion 134, and an engagement determination portion 135.

The measurement value acquisition portion 131 acquires a displacement measured by the displacement sensor 96 or an oil pressure sensor 97 which will be described later.

The controller 132 controls each portion of the variable-speed speed increaser.

The moving portion controller 133 moves the moving portion 36 in the axial direction. Specifically, the oil supply portion 57 is controlled such that the working oil is supplied to the first oil supply space S1 and to move the moving portion 36.

The engagement promotion portion 134 controls the variable-speed motor 71 to cause the variable-speed rotor 72 to perform an engagement promoting operation.

The engagement determination portion 135 determines an engagement state of the Hirth coupling 40 on the basis of a displacement G of the moving portion 36 acquired by the measurement value acquisition portion 131.

The circulation system 5 includes the oil supply portion 57, the oil supply path 78, an oil leak hole 54 formed in the fixed seal portion 49, and the oil pressure sensor 97 which measures the oil pressure in the first oil supply space S1.

The oil leak hole 54 is a through-hole having a small diameter via which the inner circumferential surface and the outer circumferential surface of the fixed seal portion 49 communicate. A plurality of oil leak holes 54 are provided in the fixed seal portion 49 at intervals in the circumferential direction (only one oil leak hole 54 is shown in FIG. 14).

The control device 3E controls the oil supply portion 57 on the basis of the oil pressure in the first oil supply space S1 acquired by the measurement value acquisition portion 131 (oil pressure sensor 97), so that the oil pressure in the first oil supply space S1 is constant. The working oil supplied from the oil supply portion 57 is discharged from the oil leak hole 54 and then recovered.

The displacement sensor 96 is provided on the surface of the fixed seal portion 49 which faces the output side. The displacement sensor 96 measures the displacement of the moving portion 36. Three displacement sensors 96 are disposed at regular intervals in the circumferential direction (only one displacement sensor 96 is shown in FIG. 14). The number of displacement sensors 96 is not limited thereto.

Next, a method of activating the variable-speed speed increaser of the embodiment will be described.

Figure 16:
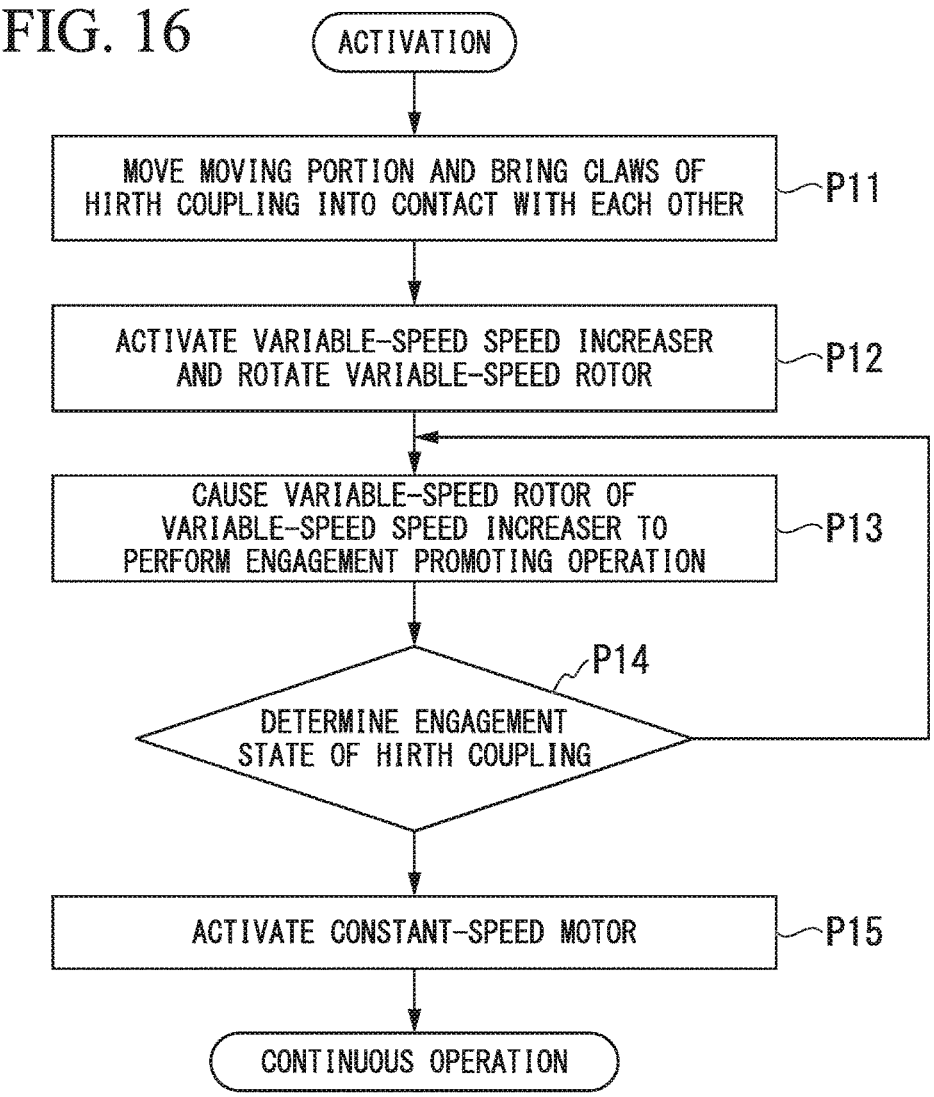
FIG. 16 is a flowchart showing a method of activating the variable-speed speed increaser according to the fifth embodiment of the present invention.

As shown in FIG. 16, the method of activating the variable-speed speed increaser includes a moving portion control step P11 of supplying the working oil to the first oil supply space S1 and moving the moving portion 36, a variable-speed rotor rotation step P12 of activating the variable-speed motor 71 and rotating the variable-speed rotor 72, an engagement promotion step P13 of causing the variable-speed rotor 72 of the variable-speed motor 71 to perform the engagement promoting operation, an engagement determination step P14 of determining the engagement state of the Hirth coupling 40, and a constant-speed motor activation step P15 of activating the constant-speed motor 51.

The moving portion control step P11 is a step of controlling the oil supply portion 57 of the drive portion 38 and supplying the working oil to the first oil supply space S1. The moving portion controller 133 of the control device 3E controls the oil supply portion 57 such that the working oil is supplied to the first oil supply space S1.

Therefore, the oil pressure in the first supply space S1 increases, and the moving portion 36 moves to the output side. Then, the claws 40c of the Hirth coupling 40 come into contact with each other.

Here, the states of the Hirth couplings 40 are classified into the following three cases.

Figure 17:
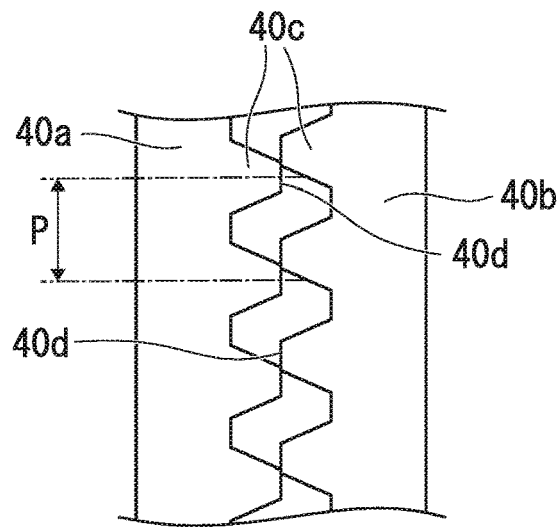
FIG. 17 is a view showing a state in which tip end surfaces of claws of the Hirth coupling come into contact with each other.

In a first state, as shown in FIG. 17, the tip end surfaces 40d of the claws 40c of the Hirth coupling 40 are in contact with each other. In this state, it is determined that the Hirth coupling 40 is not engaged.

Figure 18:
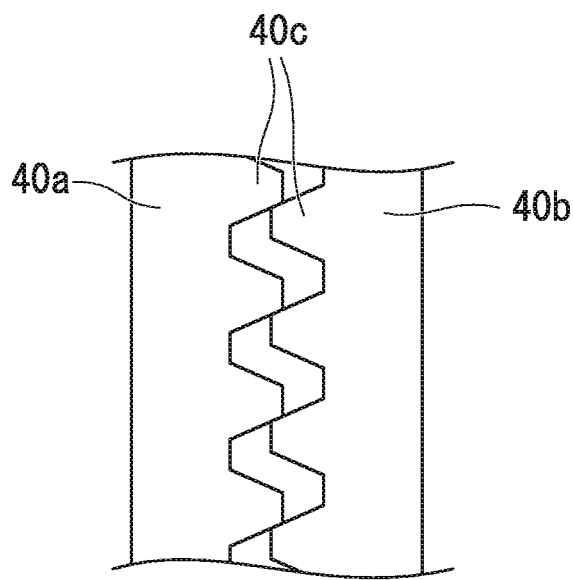
FIG. 18 is a view showing a state in which the claws of the Hirth coupling partially engage with each other.

In a second state, as shown in FIG. 18, the claws 40c of the Hirth coupling 40 are partially engaged. In this state, it is determined that the Hirth coupling 40 is not engaged.

A third state is a state in which the Hirth coupling 40 is fully engaged.

The variable-speed rotor rotation step P12 is a step of controlling the variable-speed motor 71 such that the variable-speed rotor 72 is rotated.

The control device 3E controls the variable-speed motor 71 so that the variable-speed rotor 72 rotates in the first direction R1. As the variable-speed rotor 72 rotates, the moving portion 36 rotates via the transmitting shaft 25, the planetary gear carrier 21, and the cylindrical portion 35 of the carrier main body 33. That is, the moving portion 36 is rotated by the variable-speed rotor rotation step P12.

The engagement promotion step P 13 is a step of causing the variable-speed rotor 72 of the variable-speed motor 71 to perform the engagement promoting operation.

The engagement promotion portion 134 of the control device 3E controls the variable-speed motor 71 so that the variable-speed rotor 72 performs the engagement promoting operation.

The engagement promoting operation is an operation of periodically changing an angular velocity of the variable-speed rotor 72. Specifically, the engagement promoting operation is an operation of periodically changing a rotation direction by repeating a normal rotation operation and a reverse rotation operation of the variable-speed rotor 72 a specified number of times. In other words, the engagement promoting operation is an operation in which positive and negative signs of the angular velocity of the variable-speed rotor 72 are periodically changed. The specified number of times is, for example, three times.

The normal rotation operation is an operation in which the variable-speed rotor 72 is rotated so that the cawls 40c constituting the Hirth coupling 40 rotate by one pitch P (refer to FIG. 17).

The engagement promoting operation is not limited to the above-described operation as long as it can promote the engagement of the Hirth coupling 40.

For example, the engagement promoting operation may change the angular velocity of the variable-speed rotor 72 without changing positive and negative signs. That is, the engagement promoting operation may be an operation in which the variable-speed rotor 72 repeats having a first angular velocity and a second angular velocity which is in the same direction as that of the first angular velocity and is larger than the first angular velocity.

Further, the engagement operating operation may be an operation for periodically changing the angular velocity of the constant-speed rotor 52. That is, the engagement promoting operation may be an operation in which at least one of the constant-speed motor 51 and the variable-speed motor 71 is controlled such that at least one of the constant-speed rotor 52 and the variable-speed rotor 72 is caused to perform the engagement promoting operation.

The second Hirth coupling 40b can be rotated without going through a gear by periodically changing the angular velocity of the constant-speed rotor 52 as the engagement promoting operation.

Further, the engagement promoting operation may be performed using external power. That is, the engagement promoting operation may be performed using an electric motor such as a helper motor and the variable-speed motor 71 different from the constant-speed motor 51. Further, the engagement promoting operation may be performed manually, that is, using the hands of an operator.

The engagement determination step P14 is a step of determining the engagement state of the Hirth coupling 40.

The engagement determination portion 135 of the control device determines the engagement state of the Hirth coupling 40 on the basis of a movement amount of the moving portion 36 acquired by the measurement value acquisition portion 131 (displacement sensor 96).

When the value of the movement amount of the moving portion 36 meets requirements for all the threshold values, it is determined that the Hirth coupling 40 is completely engaged (YES).

When at least one value of the movement amount of the moving portion 36 does not satisfy the threshold value, it is determined that the Hirth coupling 40 is not engaged (NO). That is, the engagement determination portion 135 determines that the Hirth coupling 40 is not engaged as shown in FIGS. 17 and 18. When it is determined that the Hirth coupling 40 is not engaged, the engagement promotion step P13 is performed again.

Here, the threshold value is a value which is set according to the movement amount of the moving portion 36 when the Hirth coupling 40 is completely engaged.

The constant-speed motor activation step P15 is a step of activating the constant-speed motor 51 such that the constant-speed rotor 52 is rotated.

The control device 3E controls the constant-speed motor 51 so that the constant-speed rotor 52 rotates in the second direction R2.

Meanwhile, the moving portion controller 133 of the control device 3E controls the oil supply portion 57 such that the working oil is continuously supplied to the first oil supply space S1, and the oil pressure in the first oil supply space S1 is continuously increased by the centrifugal force. Accordingly, the pressing force due to the moving portion 36 increases, and a torque of the constant-speed motor 51 is transmitted via the engaged Hirth coupling 40.

Thus, the constant-speed motor 51 reaches the rated rotational speed.

Next, a control method at the time of tripping of the variable-speed speed increaser of the embodiment will be described.

Figure 19:
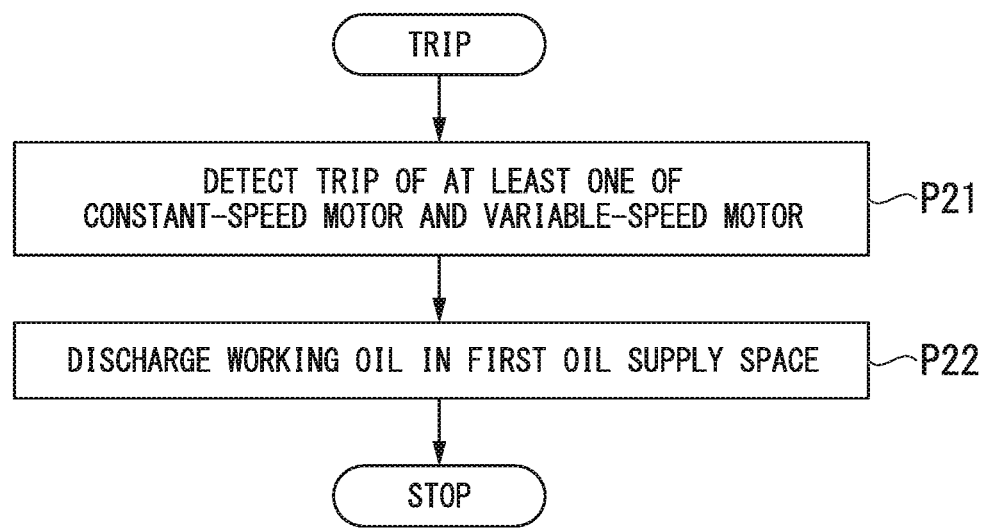
FIG. 19 is a flowchart showing a control method at the time of tripping of the variable-speed speed increaser according to the fifth embodiment of the present invention.

As shown in FIG. 19, the control method at the time of trip of the variable-speed speed increaser includes a trip detection step P21 of detecting that at least one of the constant-speed motor 51 and the variable-speed motor 71 is on a trip, and a working oil discharge step P22 of controlling the oil discharge mechanism 70 (refer to FIG. 4) and discharging the working oil in the first oil supply space S1.

In the trip detection step P21, the control device 3E detects the trip of the constant-speed motor 51 or the variable-speed motor 71. For example, the trip of the constant-speed motor 51 or the variable-speed motor 71 can be detected on the basis of current values or the like of the constant-speed motor 51 and the variable-speed motor 71.

In the working oil discharge step P22, the control device 3E receives the detection of the trip and controls the oil discharge mechanism 70 to discharge the working oil in the first oil supply space S1. Therefore, the oil pressure in the first oil supply space S1 sharply drops. Then, the moving portion 36 is moved to the input side by a tension of the tension coil spring 69, and the Hirth coupling 40 is separated.

Torque transmission from the constant-speed motor 51 to the variable-speed motor 71 is interrupted by separating the Hirth coupling 40. Accordingly, the variable-speed motor 71 stops without over-rotation.

According to the above-described embodiment, at the time of activation of the variable-speed speed increaser, it is possible to reliably engage the Hirth coupling 40 which is an engaging portion of the moving portion 36 and the fixed portion 39 by performing the engagement promoting operation.

Further, it is possible to eliminate a situation in which the Hirth coupling 40 is not engaged despite the engagement promoting operation by the engagement determination portion 135 determining the engagement state on the basis of the measurement value of the displacement sensor 96.

Further, it is possible to minimize the temperature rise of the working oil by circulating the working oil in the first oil supply space S1 using the circulation system 5. In addition, it is possible to minimize the amount of deteriorated working oil remaining.

Although the embodiments of the present invention have been described in detail with reference to the drawings, the specific constitution is not limited to these embodiments, and design changes and so on within the scope not deviating from the gist of the present invention are included.

Further, in the above-described embodiment, a four-pole three-phase induction motor is an exemplary example of a constant-speed motor 51 suitable for rotating the compressor C at high speed, and an eight-pole three-phase induction motor is an exemplary example of a variable-speed motor 71 suitable for varying the rotation rate of the compressor C within a certain range. However, when it is unnecessary to rotate the driving target at high speed, other types of electric motors may be used as the constant-speed motor 51 and the variable-speed motor 71.

REFERENCE SIGNS LIST

1 Variable-speed speed increaser
2 Clutch mechanism
3 Control device
5 Circulation system
10 Transmission device
10S Transmission device support portion
11 Sun gear
12 Sun gear shaft
15 Planetary gear
17 Internal gear
21 Planetary gear carrier
22 Planetary gear shaft
25 Transmitting shaft
27 Planetary gear carrier shaft
27*i* Input-side planetary gear carrier shaft
27*o* Output-side planetary gear carrier shaft
28 Flange
31 Internal gear carrier
33 Carrier main body
35 Cylindrical portion
35*a* Second spur gear
36 Moving portion
37 Internal gear carrier shaft
38 Drive portion
39 Fixed portion
40 Hirth coupling (engaging portion)
40*a* First Hirth coupling
40*b* Second Hirth coupling
40*c* Claw (Hirth coupling)
41 Transmission casing
42 Sun gear bearing
45 First disk portion
46 Second disk portion
47 Third disk portion
48 Fourth disk portion
48*a* First spur gear
49 Fixed seal portion
50 Electric driving device
50S Electric driving device support portion
51 Constant-speed motor
52 Constant-speed rotor
53 Constant-speed rotor shaft
54 Oil leak hole
56 Conductive body
57 Oil supply portion
57*a* Pipe
58 Boss portion
59 Connecting portion
60*a* Seal member
60*b* Seal member (second disk portion)
60*c* Seal member (first disk portion)
60*d* Seal member (first disk portion)
60*e* Seal member (first disk portion)
61 Constant-speed motor casing
64 Opening (constant-speed motor casing)
66 Constant-speed stator
67 Biasing mechanism
68 Spring fixing member
69 Tension coil spring
70 Oil discharge mechanism (oil discharge portion)
71 Variable-speed motor
72 Variable-speed rotor
73 Variable-speed rotor shaft
74 Shaft insertion hole
76 Conductive body
77 Internal gear carrier bearing
78, 78C Oil supply path
79 Nozzle
81 Variable-speed motor casing
84 Opening (variable-speed motor casing)
86 Variable-speed stator
87 Thrust bearing
88 Oil supply nozzle
90 Frame
91 Cooling fan
96 Displacement sensor
97 Oil pressure sensor
100 Rotation rate controller
101 Frequency conversion portion
102 Rotation direction switching portion
110 Power source line
111 Variable-speed motor switch
112 Constant-speed motor switch
120 Controller (control device)
121 Receiving portion
122 Interface
123 Calculating portion
131 Measurement value acquisition portion
132 Controller
133 Moving portion controller
134 Engagement promotion portion
135 Engagement determination portion
Ac Constant-speed input shaft
Ao Output shaft
Ap Center line (planetary gear shaft)
Ar Axis
Av Variable-speed input shaft
C Compressor
R1 First direction
R2 Second direction
S1 First oil supply space
S2 Second oil supply space
S3 Communication path

The invention claimed is:

1. A variable-speed speed increaser comprising:
an electric driving device which generates a rotational driving force; and
a transmission device which changes the speed of the rotational driving force generated by the electric driving device and transmits the changed rotation driving force to a driving target,
wherein the transmission device comprises
a sun gear which rotates about an axis,
a sun gear shaft which is fixed to the sun gear and extends in an axial direction around the axis,
a planetary gear which meshes with the sun gear, revolves around the axis and rotates about its own center line,
an internal gear which has a plurality of teeth aligned annularly around the axis and meshes with the planetary gear,
a planetary gear carrier which has a planetary gear carrier shaft extending in the axial direction around the axis and supports the planetary gear to be revolvable around the axis and rotatable around a center line of the planetary gear itself, and
an internal gear carrier which has an internal gear carrier shaft extending in the axial direction around the axis and supports the internal gear to be rotatable about the axis,
the sun gear shaft forms an output shaft connected to the driving target, the internal gear carrier shaft forms a constant-speed input shaft, and the planetary gear carrier shaft forms a variable-speed input shaft,
the electric driving device comprises
a constant-speed motor having a constant-speed rotor which rotates the constant-speed input shaft of the transmission device, and
a variable-speed motor having a variable-speed rotor connected to the variable-speed input shaft of the transmission device,
the internal gear carrier comprises a clutch mechanism which connects a cylindrical portion connected to the internal gear with the internal gear carrier shaft, and
the clutch mechanism comprises
a moving portion which is connected to one of the cylindrical portion and the internal gear carrier shaft to be movable in the axial direction,
a drive portion which drives the moving portion in the axial direction,
a fixed portion which is fixed to the other one of the cylindrical portion and the internal gear carrier shaft, and
an engaging portion which engages the moving portion and the fixed portion by moving the moving portion in the axial direction.

2. The variable-speed speed increaser according to claim 1, wherein the engaging portion includes a pair of disk-shaped members which are provided on the moving portion and the fixed portion and have a plurality of claws formed at regular intervals in a circumferential direction around the axis.

3. The variable-speed speed increaser according to claim 2 further comprising a control device, wherein
the control device includes:
a moving portion controller which moves the moving portion in the axial direction to bring the claws of the disk-shaped members into contact with each other, and
an engagement promotion portion which controls at least one of the constant-speed motor and the variable-speed motor such that at least one of the constant-speed rotor and the variable-speed rotor is caused to perform an engagement promoting operation, thereby promoting engagement between the disk-shaped members.

4. The variable-speed speed increaser according to claim 3, wherein the control device includes an engagement determination portion which determines an engagement state of the engaging portion on the basis of a movement amount of the moving portion and repeats the engagement promoting operation when the movement amount is less than a threshold value.

5. A control device for the variable-speed speed increaser according to claim 2,
the control device comprising:
a moving portion controller which moves the moving portion in the axial direction and brings the claws of the disk-shape members into contact with each other, and
an engagement promotion portion which controls at least one of the constant-speed motor and the variable-speed motor to cause at least one of the constant-speed rotor and the variable-speed rotor to promote an engagement promoting operation, thereby promoting engagement between the disk-shaped members.

6. The control device according to claim 5, wherein the engagement promoting operation is an operation which periodically changes an angular velocity of the variable-speed rotor.

7. The control device according to claim 5, wherein the engagement promoting operation is an operation which periodically changes a rotation direction of the variable-speed rotor.

8. The control device according to claim 5, wherein the engagement promoting operation is an operation which periodically changes an angular velocity of the constant-speed rotor.

9. The control device according to claim 5, wherein the engagement promoting operation is an operation which periodically changes a position of the moving portion in the axial direction.

10. The control device according to claim 5, further comprising an engagement determination portion which determines an engagement state of the engagement portion on the basis of a movement amount of the moving portion and repeats the engagement promoting operation when the movement amount does not reach a threshold value.

11. The variable-speed speed increaser according to claim 1, wherein the drive portion includes
a disk which is fixed to the other one of the cylindrical portion and the internal gear carrier shaft to face the moving portion in the axial direction and forms an oil supply space between the disk and the moving portion,
an oil supply portion which supplies oil into the oil supply space, and
an oil discharge portion which discharges the oil from the oil supply space.

12. The variable-speed speed increaser according to claim 11, further comprising:
an oil leak hole which allows the oil to leak from the oil supply space,
an oil pressure sensor which measures an oil pressure in the oil supply space, and a control device which controls the oil supply portion so that the oil pressure becomes constant.

13. The variable-speed speed increaser according to claim 11, wherein the oil supply portion includes an oil supply path which is formed in at least one of the fixed portion and the disk, and a nozzle which supplies the oil supplied to the oil supply path into the oil supply space.

14. The variable-speed speed increaser according to claim 11, wherein the oil supply space includes
a first oil supply space which is formed between the moving portion and the disk, and
a second oil supply space which communicates with the first oil supply space and is formed inside the constant-speed rotor, and
the oil supply portion supplies the oil into the second oil supply space.

15. The variable-speed speed increaser according to claim 1, wherein the variable-speed rotor is formed in a cylindrical shape centered on the axis, and the constant-speed input shaft is inserted through a shaft insertion hole which passes therethrough in the axial direction.

16. A control method of a variable-speed speed increaser, the variable-speed speed increaser comprising:
an electric driving device which generates a rotational driving force; and
a transmission device which changes the speed of the rotational driving force generated by the electric driving device and transmits the changed rotation driving force to a driving target, wherein
the transmission device comprises
a sun gear which rotates about an axis,
a sun gear shaft which is fixed to the sun gear and extends in an axial direction around the axis,
a planetary gear which meshes with the sun gear, revolves around the axis and rotates about its own center line,
an internal gear which has a plurality of teeth aligned annularly around the axis and meshes with the planetary gear,
a planetary gear carrier which has a planetary gear carrier shaft extending in the axial direction around the axis and supports the planetary gear to be revolvable around the axis and rotatable around a center line of the planetary gear itself, and
an internal gear carrier which has an internal gear carrier shaft extending in the axial direction around the axis and supports the internal gear to be rotatable about the axis,
the sun gear shaft forms an output shaft connected to the driving target, the internal gear carrier shaft forms a constant-speed input shaft, and the planetary gear carrier shaft forms a variable-speed input shaft,
the electric driving device comprises
a constant-speed motor having a constant-speed rotor which rotates the constant-speed input shaft of the transmission device, and
a variable-speed motor having a variable-speed rotor connected to the variable-speed input shaft of the transmission device,
the internal gear carrier comprises
a clutch mechanism which connects a cylindrical portion connected to the internal gear with the internal gear carrier shaft, and
the clutch mechanism comprises
a moving portion which is connected to one of the cylindrical portion and the internal gear carrier shaft to be movable in the axial direction,
a drive portion which drives the moving portion in the axial direction,
a fixed portion which is fixed to the other one of the cylindrical portion and the internal gear carrier shaft, and
an engaging portion which engages the moving portion and the fixed portion by moving the moving portion in the axial direction and includes a pair of disk-shaped members provided on the moving portion and the fixed portion and having a plurality of claws formed at regular intervals in a circumferential direction around the axis,
the control method comprising:
a moving portion control step of moving the moving portion in the axial direction and bringing the claws of the disk-shaped members into contact with each other, and
an engagement promotion step of controlling at least one of the constant-speed motor and the variable-speed motor to cause at least one of the constant-speed rotor and the variable-speed rotor to promote an engagement promoting operation, thereby promoting engagement between the disk-shaped members.

17. The control method according to claim 16, wherein the engagement promoting operation is an operation which periodically changes an angular velocity of the variable-speed rotor.

18. The control method according to claim 16, wherein the engagement promoting operation is an operation which periodically changes a rotation direction of the variable-speed rotor.

19. The control method according to claim 16, wherein the engagement promoting operation is an operation which periodically changes an angular velocity of the constant-speed rotor.

20. The control method according to claim 16, wherein the engagement promoting operation is an operation which periodically changes a position of the moving portion in the axial direction.

21. The control method according to claim 16, further comprising an engagement determination step of determining an engagement state of the engagement portion on the basis of a movement amount of the moving portion and repeating the engagement promoting operation when the movement amount does not reach a threshold value.

* * * * *